US012118093B2

(12) United States Patent
Zhang et al.

(10) Patent No.: US 12,118,093 B2
(45) Date of Patent: Oct. 15, 2024

(54) EXTENDED AUTHENTICATION METHOD AND APPARATUS FOR GENERIC BOOTSTRAPPING ARCHITECTURE, AND STORAGE MEDIUM

(71) Applicant: HUAWEI TECHNOLOGIES CO., LTD., Guangdong (CN)

(72) Inventors: Bo Zhang, Shenzhen (CN); Philip Ginzboorg, Helsinki (FI); Valtteri Niemi, Helsinki (FI); Pekka Laitinen, Helsinki (FI)

(73) Assignee: Huawei Technologies Co., Ltd., Shenzhen (CN)

( * ) Notice: Subject to any disclaimer, the term of this patent is extended or adjusted under 35 U.S.C. 154(b) by 514 days.

(21) Appl. No.: 17/169,737

(22) Filed: Feb. 8, 2021

(65) Prior Publication Data

US 2021/0165885 A1 Jun. 3, 2021

Related U.S. Application Data

(63) Continuation of application No. PCT/CN2019/095193, filed on Jul. 9, 2019.

(30) Foreign Application Priority Data

Aug. 10, 2018 (CN) .......................... 201810911034.4

(51) Int. Cl.
*G06F 15/177* (2006.01)
*G06F 9/00* (2006.01)
(Continued)

(52) U.S. Cl.
CPC .......... *G06F 21/575* (2013.01); *H04L 63/083* (2013.01); *H04W 12/06* (2013.01)

(58) Field of Classification Search
CPC ..... G06F 21/575; G06F 21/44; H04L 63/083; H04L 9/3213; H04L 9/3242;
(Continued)

(56) References Cited

U.S. PATENT DOCUMENTS

2006/0101270 A1 * 5/2006 Laitinen .................. H04L 9/321
713/176
2007/0124587 A1 5/2007 Krishnamurthi et al.
(Continued)

FOREIGN PATENT DOCUMENTS

CN 101087261 A 12/2007
CN 101156486 A 4/2008
(Continued)

OTHER PUBLICATIONS

3GPP TS 24.109 V15.0.0 (Jun. 2018), "3rd Generation Partnership Project; Technical Specification Group Core Network and Terminals; Bootstrapping interface (Ub) and network application function interface (Ua); Protocol details(Release 15)," Jun. 2018, 77 pages.
(Continued)

*Primary Examiner* — Xuxing Chen
(74) *Attorney, Agent, or Firm* — Fish & Richardson P.C.

(57) ABSTRACT

This application provides an extended authentication method and apparatus for a generic bootstrapping architecture and a storage medium. A first network element obtains a bootstrapping transaction identifier (B-TID) and a key lifetime; and the first network element sends the B-TID and the key lifetime to the terminal, so that the terminal performs extensible authentication protocol (EAP)-based generic bootstrapping architecture (GBA) authentication and key agreement (AKA) authentication with the first network element based on the B-TID and the key lifetime.

18 Claims, 12 Drawing Sheets

(51) Int. Cl.
  G06F 21/57 (2013.01)
  H04L 9/40 (2022.01)
  H04W 12/06 (2021.01)
(58) Field of Classification Search
  CPC ... H04L 9/0863; H04L 9/3226; H04L 9/3271; H04W 12/06; H04W 12/041; H04W 12/02
  See application file for complete search history.

(56) References Cited

U.S. PATENT DOCUMENTS

| | | | |
|---|---|---|---|
| 2011/0255692 A1 | 10/2011 | Soliman et al. | |
| 2014/0349614 A1* | 11/2014 | Starsinic | H04L 63/0428 455/411 |
| 2015/0163669 A1* | 6/2015 | Holtmanns | H04L 63/061 726/6 |
| 2016/0205555 A1* | 7/2016 | Agiwal | H04W 12/03 713/168 |
| 2019/0253407 A1* | 8/2019 | Livanos | H04W 12/04 |
| 2020/0389788 A1* | 12/2020 | Smeets | H04W 12/04 |

FOREIGN PATENT DOCUMENTS

| | | | | |
|---|---|---|---|---|
| CN | 101888626 A | 11/2010 | | |
| CN | 102238540 A | 11/2011 | | |
| CN | 104509144 A | 4/2015 | | |
| GB | 2518257 A * | 3/2015 | ......... | G06F 13/1689 |
| WO | WO-2007063420 A2 * | 6/2007 | ........... | H04L 63/061 |
| WO | WO-2009106091 A1 * | 9/2009 | ........... | H04L 63/083 |
| WO | WO-2013159818 A1 * | 10/2013 | ........... | G06F 21/575 |
| WO | WO-2017153858 A1 * | 9/2017 | ............ | G06F 21/44 |
| WO | 2018138355 A1 | 8/2018 | | |

OTHER PUBLICATIONS

3GPP TS 33.501 V1.0.0 (Mar. 2018), "3rd Generation Partnership Project; Technical Specification Group Services and System Aspects; Security architecture and procedures for 5G system(Release 15)," Mar. 2018, 128 pages.

Extended European Search Report issued in European Application No. 19848561.7 dated Aug. 5, 2021, 9 pages.

Huawei, Hisilicon, "Key Issue on Keys used in 5G GBA," 3GPP TSG SA WG3 (Security) Meeting #92, S3-182261, Dalian, Aug. 20-24, 2018, 1 page.

3GPP TS 23.003 V15.4.0 (Jun. 2018), "3rd Generation Partnership Project; Technical Specification Group Core Network and Terminals; Numbering, addressing and identification (Release 15)," Jun. 2018, 121 pages.

3GPP TS 31.102 V15.1.0 (Jun. 2018), "3rd Generation Partnership Project; Technical Specification Group Core Network and Terminals; Characteristics of the Universal Subscriber Identity Module (USIM) application (Release 15)," Jun. 2018, 305 pages.

3GPP TS 33.220 V15.2.0 (Jun. 2018), "3rd Generation Partnership Project; Technical Specification Group Services and System Aspects; Generic Authentication Architecture (GAA); Generic Bootstrapping Architecture (GBA) (Release 15)," Jun. 2018, 93 pages.

China Mobile, "Candidate solution of introducing third party key to AKMA," 3GPP TSG SA WG3 (Security) Meeting #92AdHoc, S3-183163, Harbin (China), Sep. 24-28, 2018, 4 pages.

Ericsson, "Authenticated GBA transaction identifier," 3GPP TSG SA WG3 Security, S3-040342, Beijing, China, May 10-14, 2004, 2 pages.

3GPP TR 33.cde V0.1.0 (May 2018), "3rd Generation Partnership Project; Technical Specification Group Services and System Aspects; Study on authentication and key management for applications; based on 3GPP credential in 5G (Release 16)," S3-182077, May 2018, 9 pages.

Huawei et al., "Solution for bootstrapping authentication of AKMA," 3GPP TSG SA WG3 (Security) Meeting #93, 83-183420, Spokane (USA), Nov. 12-16, 2018, 4 pages.

Mockapetris, "Domain Names—Implementation and Specification," Network Working Group, Request for Comments: 1035, Nov. 1987, 55 pages.

Niemi et al., "Hypertext Transfer Protocol (HTTP) Digest Authentication Using Authentication and Key Agreement (AKA)," Network Working Group, Request for Comments: 3310, Sep. 2002, 18 pages.

Arkko et al., "Extensible Authentication Protocol Method for 3rd Generation Authentication and Key Agreement (EAP-AKA)," Network Working Group, Request for Comments: 4187, Jan. 2006, 79 pages.

Arkko et al., "Improved Extensible Authentication Protocol Method for 3rd Generation Authentication and Key Agreement (EAP-AKA)," Network Working Group, Request for Comments: 5448, May 2009, 29 pages.

PCT International Search Report and Written Opinion issued in International Application No. PCT/CN2019/095193 dated Oct. 22, 2019, 16 pages (with English translation).

3GPP TS 33.501 V0.4.0 (Oct. 2017), "3rd Generation Partnership Project; Technical Specification Group Services and System Aspects; Security Architecture and Procedures for 5G System (Release 15)," Oct. 2017, 70 pages.

Office Action issued in Chinese Application No. 201810911034.4 dated Jun. 3, 2021, 6 pages.

Office Action issued in Chinese Application No. 201810911034.4 dated Sep. 17, 2021, 6 pages (with English translation).

Ericsson et al., "Clarifications to: Using additional EAP methods for primary authentication," 3GPP TSG-SA WG3 Meeting #91-Bis, S3-181993, La Jolla, US, May 21-25, 2018, 9 pages.

* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Code      |   Identifier  |            Length             |
+-+-+-+-+-+-+-+-+-+-+-+-+-+-+-+-+-+-+-+-+-+-+-+-+-+-+-+-+-+-+-+-+
|     Type      |    Subtype    |           Reserved            |
+-+-+-+-+-+-+-+-+-+-+-+-+-+-+-+-+-+-+-+-+-+-+-+-+-+-+-+-+-+-+-+-+
```

FIG. 5A

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Attribute Type |    Length    |            Value ...          |
+-+-+-+-+-+-+-+-+-+-+-+-+-+-+-+-+-+-+-+-+-+-+-+-+-+-+-+-+-+-+-+-+
```

FIG. 5B

| AT_B-TID | length | B-TID length | B-TID |

FIG. 6A

| AT_B-TID | B-TID length | B-TID |

FIG. 6B

| AT_Key lifetime | length | Key lifetime length | Key lifetime |

FIG. 7A

| AT_Key lifetime | Key lifetime length | Key lifetime |

FIG. 7B

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|    Code   |  Identifier   |            Length             |
+-+-+-+-+-+-+-+-+-+-+-+-+-+-+-+-+-+-+-+-+-+-+-+-+-+-+-+-+-+-+-+-+
```

Code
   3 for Success
   4 for Failure

FIG. 9

EXTENDED AUTHENTICATION METHOD AND APPARATUS FOR GENERIC BOOTSTRAPPING ARCHITECTURE, AND STORAGE MEDIUM

CROSS-REFERENCE TO RELATED APPLICATIONS

This application is a continuation of International Application No. PCT/CN2019/095193, filed on Jul. 9, 2019, which claims priority to Chinese Patent Application No. 201810911034.4, filed on Aug. 10, 2018. The disclosures of the aforementioned applications are hereby incorporated by reference in their entireties.

TECHNICAL FIELD

This application relates to the field of communications technologies, and in particular, to an extended authentication method and apparatus for a generic bootstrapping architecture, and a storage medium.

BACKGROUND

As a generic bootstrapping architecture (GBA) for mobile communications, a GBA technology may be used to establish a security tunnel between user equipment (UE) and a network application function (NAF). The GBA technology includes GBA authentication and key agreement (AKA) authentication.

In a universal mobile telecommunications system (UMTS) 3G scenario, a specific definition of the GBA AKA authentication is provided in 3GPP TS33.220. In the defined GBA AKA authentication, the UE and a bootstrapping server function (BSF) implement the GBA AKA authentication based on a hypertext transfer protocol (HTTP). The inventor studies an extended authentication method for a GBA in consideration of a development trend of an extensible authentication protocol (EAP) and a possibility of another application in the future.

SUMMARY

This application provides an extended authentication method and apparatus for a generic bootstrapping architecture, and a storage medium, so that UE and a BSF complete GBA AKA authentication based on an EAP.

According to a first aspect, this application provides an extended authentication method for a generic bootstrapping architecture, including: first network element obtains a B-TID and a key lifetime; and the first network element sends the B-TID and the key lifetime to a terminal, so that the terminal performs EAP-based GBA AKA authentication with the first network element based on the B-TID and the key lifetime.

Beneficial effects of this application include: Because the extended authentication method for a generic bootstrapping architecture provided in this application is based on an EAP, UE and a BSF can complete GBA AKA authentication based on the EAP.

Optionally, that the first network element obtains the B-TID may include: The first network element generates the B-TID based on a RAND and a BSF server name; or the first network element generates an identifier, and uses the identifier as the B-TID.

Optionally, that the first network element sends the B-TID and the key lifetime to a terminal includes: The first network element sends an AKA-challenge message requested by an EAP to the terminal, where the AKA-challenge message requested by the EAP carries the B-TID and the key lifetime. In other words, the B-TID and the key lifetime are transmitted by using the AKA-challenge message requested by the EAP.

Optionally, after the first network element sends the B-TID and the key lifetime to the terminal, the method provided in this application may further include: The first network element receives a RES and a MAC that are sent by the terminal, and performs verification on the RES and the MAC; and if the verification succeeds, the first network element generates a key, and sends an EAP-success message to the terminal, to complete the EAP-based GBA AKA authentication.

Optionally, before the first network element obtains the B-TID and the key lifetime, the method further includes: The first network element receives a terminal identifier sent by the terminal.

Optionally, after the first network element receives the terminal identifier sent by the terminal, the method further includes: The first network element obtains the RAND, an AUTN, and the MAC in either of the following manners:

Manner 1: The first network element executes an AKA algorithm to generate the RAND, the AUTN, and the MAC.

Manner 2: The first network element receives the RAND, the AUTN, and the MAC.

Optionally, that the first network element receives a terminal identifier sent by the terminal may include: The first network element receives a terminal identifier sent by a second network element, where the terminal identifier is sent by the terminal to the second network element after the terminal receives an EAP request message sent by the second network element, and the EAP request message is used to request the terminal identifier.

According to a second aspect, this application provides an extended authentication method for a generic bootstrapping architecture, including: A terminal receives a B-TID and a key lifetime that are sent by a first network element; and the terminal performs EAP-based GBA AKA authentication with the first network element based on the B-TID and the key lifetime.

Beneficial effects of this application include: Because the extended authentication method for a generic bootstrapping architecture provided in this application is based on an EAP, UE and a BSF can complete GBA AKA authentication based on the EAP.

Optionally, that a terminal receives a B-TID and a key lifetime that are sent by a first network element may include: The terminal receives an AKA-challenge message that is requested by an EAP and that is sent by the first network element, where the AKA-challenge message requested by the EAP carries the B-TID and the key lifetime.

Optionally, that the terminal performs EAP-based GBA authentication with the first network element based on the B-TID and the key lifetime includes: The terminal obtains a RAND, art AUTN, and a MAC; the terminal executes an AKA algorithm to perform verification on the AUTN and the MAC; the terminal generates a RES and a key; the terminal sends the RES and the MAC to the first network element, so that the first network element performs verification on the RES and the MAC, and if the verification succeeds, the first network element generates a key, and sends an EAP-success message to the terminal; and the terminal receives the EAP-success message.

Optionally, before the terminal receives the B-TID and the key lifetime that are sent by the first network element, the method further includes: The terminal sends a terminal identifier to the first network element.

Optionally, that the terminal sends a terminal identifier to the first network element includes: The terminal sends the terminal identifier to a second network element, so that the second network element sends the terminal identifier to the first network element.

Optionally, before the terminal sends the terminal identifier to the first network element, the method further includes: The terminal receives an EAP request message sent by the second network element, where the EAP request message is used to request the terminal identifier.

On the foregoing basis, there may further be the following possible implementations:

Optionally, the B-TID may be further used to determine a BSF address and/or a key.

Optionally, the B-TID and the key lifetime are protected by the MAC.

Optionally, information is sent and received between the terminal and the first network element through the second network element, and the information herein includes but is not limited to the B-TID and the key lifetime.

Optionally, the terminal identifier may be a permanent identifier or a temporary identifier, and includes any one of the following: a SUPI, a SUCI, an IMPI, a TMPI, a GUTI, a TMSI, an IMPU, an App ID, a network identifier, a service identifier, and a NAI.

According to a third aspect, this application provides a key generation method, including: obtaining a key parameter, where the key parameter includes at least one of an EMSK, an MSK, and a CK and an IK; and generating a key based on the key parameter.

Optionally, the generating a key based on the key parameter includes any one of the following implementations:

Implementation 1: The key parameter includes a CK and an IK, and a derivation formula 1 is calculated: Ks=CK||IK, where CK||IK represents cascading of the CK and the IK.

Implementation 2: The key parameter includes an EMSK, and a derivation formula 2 is calculated: Ks=EMSK.

Implementation 3: The key parameter includes an MSK, and a derivation formula 3 is calculated: Ks=MSK.

In the foregoing formulas, Ks represents the generated key.

Optionally, the generating a key based on the key parameter includes: generating the key based on a basic key generated in an authentication process, where the basic key includes at least one of CK||IK, an EMSK, and an MSK.

Optionally, the generating the key based on a basic key generated in an authentication process may include: generating the key Ks in the following manner, where a specific derivation formula is as follows:

Formula 4: Ks=KDF (basic key), where KDF represents a key derivation function.

Formula 5: Ks=KDF (basic key, BSF ID).

Formula 6: Ks=KDF (basic key, SN ID), where SN ID represents a serving network ID.

Formula 7: Ks=KDF (basic key. SN ID, BSF ID).

Optionally, any one of the foregoing derivation formulas may further include an indicator indicating a protocol type, where the protocol type includes at least one of the following: EAP, EAP AKA, EAP AKA', 5G, 5G AKA, GBA, 5G GBA, and the like.

Optionally, any one of the foregoing derivation formulas further includes at least one of the following parameters: a UE ID, a session ID, an EAP server ID, an authenticator ID, an uplink or downlink counter, a sequence number, and a nonce.

According to a fourth aspect, this application provides an extended authentication apparatus for a generic bootstrapping architecture. The apparatus has a function of implementing behavior of the first network element in the first aspect or an optional method reality of the first aspect. The function may be implemented by using hardware, or may be implemented by executing corresponding software by hardware. The hardware or software includes one or more modules corresponding to the foregoing function.

According to a fifth aspect, this application provides an extended authentication apparatus for a generic bootstrapping architecture. The apparatus has a function of implementing behavior of the terminal in the second aspect or an optional method reality of the second aspect. The function may be implemented by using hardware, or may be implemented by executing corresponding software by hardware. The hardware or software includes one or more modules corresponding to the foregoing function.

According to a sixth aspect, this application provides a key generation apparatus. The apparatus has a function of implementing key generation behavior in the third aspect or an optional method reality of the third aspect. The function may be implemented by using hardware, or may be implemented by executing corresponding software by hardware. The hardware or software includes one or more modules corresponding to the foregoing function.

According to a seventh aspect, this application provides an extended authentication apparatus for a generic bootstrapping architecture. A structure of the apparatus includes a processor and a transceiver. The processor is configured to support the apparatus in performing corresponding functions in the first aspect or an optional method of the first aspect. The transceiver is configured to: support communication between the apparatus and a terminal, and receive and send information or an instruction involved in the foregoing method. The apparatus may further include a memory, and the memory is configured to couple to the processor to store a program instruction and data that are necessary for the apparatus.

According to an eighth aspect, this application provides an extended authentication apparatus for a generic bootstrapping architecture. A structure of the apparatus includes a processor and a transceiver. The processor is configured to support the apparatus in performing corresponding functions in the second aspect or an optional method of the second aspect. The transceiver is configured to: support communication between the apparatus and a first network element, and receive and send information or an instruction involved in the foregoing method. The apparatus may further include a memory, and the memory is configured to couple to the processor to store a program instruction and data that are necessary for the apparatus.

According to a ninth aspect, this application provides a key generation apparatus. A structure of the apparatus includes a processor and a memory. The processor is configured to support the apparatus in performing corresponding functions in the third aspect or an optional method of the third aspect. The memory is configured to couple to the processor, and stores a program instruction and data that are necessary for the apparatus.

According to a tenth aspect, this application provides a computing storage medium, including a program instruction. The program instruction is used to implement the extended authentication method for a generic bootstrapping architecture in the first aspect or the optional manner of the first aspect.

According to an eleventh aspect, this application provides a computing storage medium, including a program instruction. The program instruction is used to implement the extended authentication method for a generic bootstrapping architecture in the second aspect or the optional manner of the second aspect.

According to a twelfth aspect, this application provides a computing storage medium, including a program instruction. The program instruction is used to implement the key generation method in the third aspect or the optional manner of the third aspect.

According to a thirteenth aspect, this application provides a computer program product, including a program instruction. The program instruction is used to implement the extended authentication method for a generic bootstrapping architecture in the first aspect or the optional manner of the first aspect.

According to a fourteenth aspect, this application provides a computer program product, including a program instruction. The program instruction is used to implement the extended authentication method for a generic bootstrapping architecture in the second aspect or the optional manner of the second aspect.

According to a fifteenth aspect, this application provides a computer program product, including a program instruction. The program instruction is used to implement the key generation method in the third aspect or the optional manner of the third aspect.

This application provides the extended authentication method and apparatus for a generic bootstrapping architecture, and the storage medium. First, because the extended authentication method for a generic bootstrapping architecture provided in this application is based on the EAP, the UE and the BSF can complete the GBA AKA authentication based on the EAP. In addition, this application further provides a key generation method, to extend a key generation manner.

BRIEF DESCRIPTION OF DRAWINGS

FIG. 5A shows a message format;

FIG. 5B shows a message format according to an embodiment of this application;

FIG. 6A shows a message format including a B-TID according to an embodiment of this application;

FIG. 6B shows another message format including a B-TID according to an embodiment of this application;

FIG. 7A shows a message format including a key lifetime according to an embodiment of this application;

FIG. 7B shows another message format including a key lifetime according to an embodiment of this application;

FIG. 9 shows a message format of an existing EAP-success message;

DESCRIPTION OF EMBODIMENTS

Figure 1:
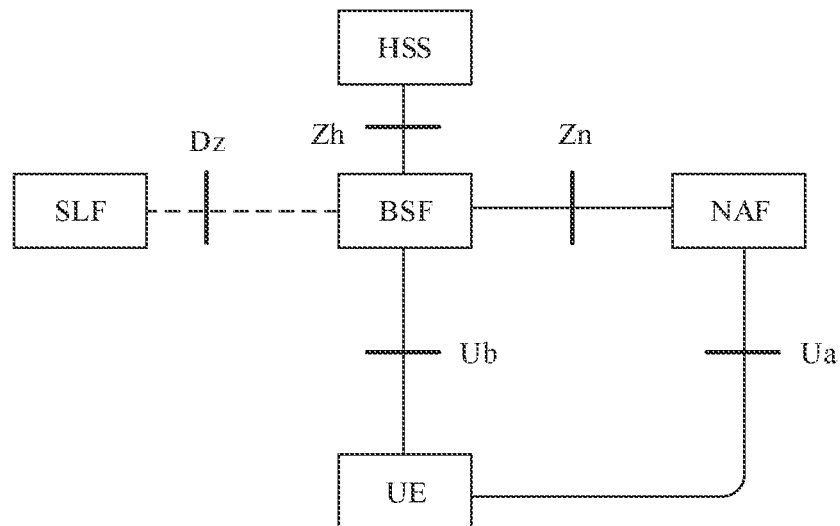
FIG. 1 is a schematic diagram of an existing GBA architecture.

FIG. 1 is a schematic diagram of an existing GBA architecture. As shown in FIG. 1, the GBA architecture includes a BSF, UE, a NAF, and a subscription locator function (SLF). The BSF is used as a hub, interacts with the UE via a Ub interface, and performs authentication between the UE and the BSF; may obtain, from an HSS via a Zh interface, a parameter that is of the UE and that is related to authentication, where the HSS stores the parameter that is of the UE and that is related to authentication; interacts with the NAF via a Zn interface; and interacts with the SLF via a Dz interface. In a plurality of HSS scenarios, the BSF may obtain, from the SLF, an HSS name corresponding to the UE. In addition, the UE interacts with the NAF via a Ua interface. Because each application corresponds to one NAF, the BSF and the UE may interact with a plurality of NAFs.

Figure 2:
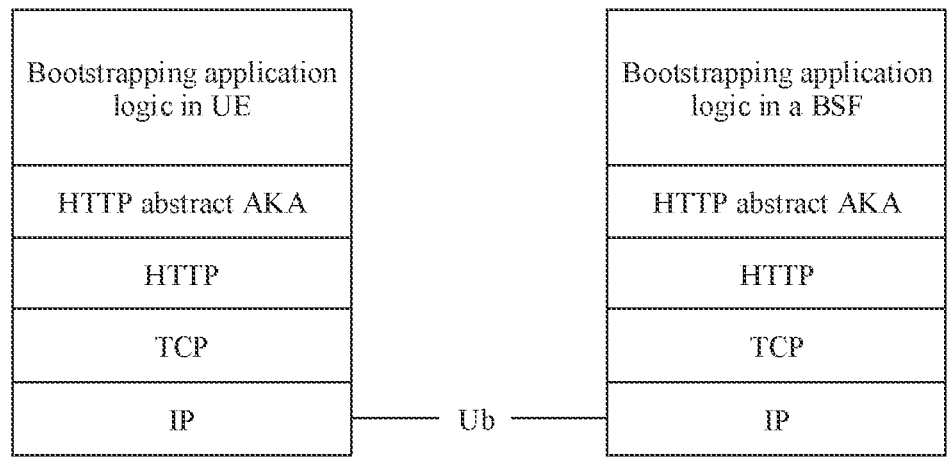
FIG. 2 shows a possible protocol stack format between UE and a BSF.

As described above, in a defined GBA AKA authentication standard, participants include the UE, the BSF, and the HSS. Key negotiation of Ks between the UE and the BSF is implemented based on a root key shared by the UE and the HSS. A shared key is established between the BSF and the UE through execution of a bootstrapping process. Specifically, the UE and the BSF complete GBA AKA authentication based on an HTTP, and specific steps are as follows: The UE sends a UE ID to the BSF; the BSF sends the UE ID to the home subscriber server (HSS); the HSS determines, based on the UE ID, that the UE ID corresponds to the root key, obtains, through calculation, an authentication vector (AV), where AV=(RAND, AUTN, CK, IK, XRES), and sends the AV to the BSF, where RAND is a random number, AUTN is an authentication token, CK is a cipher key, IK is an integrity protection key (Integrity key), and XRES is an expected user response; the BSF sends the RAND and the AUTN in the AV to the UE; the UE performs verification on the AUTN, and obtains the CK, the IK, and a RES through calculation, where the RES is a user response; the UE sends the RES to the BSF; the BSF compares the XRES with the RES to verify whether the RES is correct; if the verification succeeds, the BSF calculates Ks=CK||IK; the BSF sends a B-TID and a key lifetime to the UE, where the BSF generates the B-TID based on the RAND and a BSF server name, namely, base64encode(RAND)@BSF_servers_domain_name, where base64encode(RAND)) means to perform Base64 encoding conversion on the RAND; and the UE obtains Ks=CK∥IK through calculation. In addition, FIG. 2 shows a possible protocol stack format between the UE and the BSF. It can also be learned from the protocol stack that existing GBA AKA authentication is based on the HTTP.

For an existing EAP AKA authentication procedure, refer to RFC4187. Three entities are mainly included.

Peer: A peer is an authenticated entity that participates in authentication, and may be a terminal device such as UE or Internet of things (IoT).

Authenticator: An authenticator participates in EAP AKA authentication, may be an entity such as an access point, and performs primary authentication or the like. In this procedure, the authenticator mainly performs data forwarding and the like.

EAP server: An EAP server is an authentication server that performs authentication on the peer.

The EAP AKA authentication procedure is described as follows:

1. The authenticator sends an EAP request message to the peer, where the EAP request message is used to request an identifier of the peer.

2. The peer sends a UE ID (for example, a network access identifier (NAI)) to the authenticator.

3. The authenticator sends the UE ID to the EAP server. Herein, the EAP server executes an AKA algorithm to generate a RAND, an AUTN, and a message authentication code (MAC), and sends the RAND, the AUTN, and the MAC to the authenticator.

4. The authenticator sends the RAND, the AUTN, and the MAC to the peer.

5. The peer executes the AKA algorithm to perform verification on the AUTN and the MAC, and generates a RES and a session key.

6. The peer sends the RES and the MAC to the authenticator.

7. The authenticator sends the RES and the MAC to the EAP server. The EAP server performs verification on the RES and the MAC, and sends an EAP-success message to the authenticator if the verification succeeds.

8. The authenticator sends the EAP-success message to the peer.

It should be noted that the MAC sent by the authenticator to the peer is different from the MAC sent by the peer to the authenticator.

Figure 3:
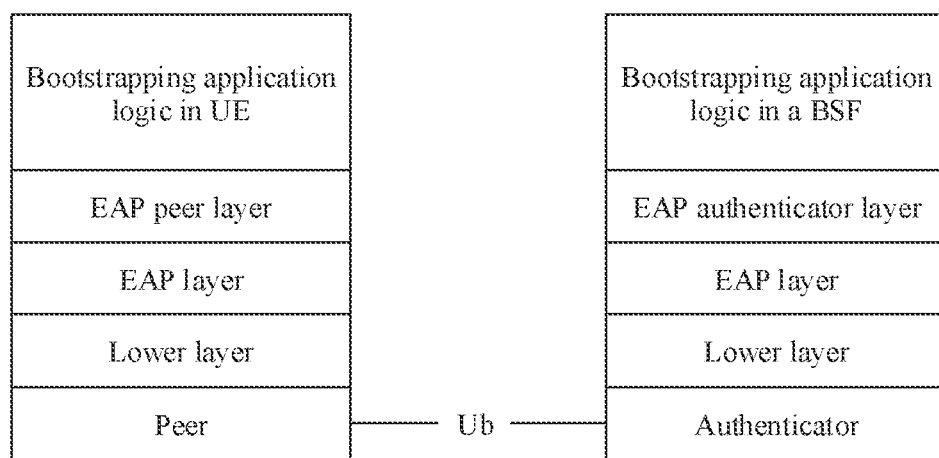
FIG. 3 shows another possible protocol stack format between UE and a BSF.

It may be found from the foregoing descriptions and FIG. 3 that, although the EAP AKA authentication is based on an EAP, an authentication process includes only transfer of the RAND, the AUTN, and the MAC, where FIG. 3 shows another possible protocol stack format between the UE and the BSF. The EAP is a widely used protocol and includes an EAP extension protocol (RFC5448), for example, another EAP authentication such as EAP AKA' or EAP-SIM. This is not limited in this application. In addition, the EAP extension protocol is also used in future 5G. Therefore, if the EAP is extended to support GBA AKA authentication, a method for sending the B-TID and the key lifetime needs to be added to the existing EAP AKA authentication procedure. In addition, to support another authentication method, such as 5G AKA, an existing GBA authentication protocol is also improved in this application.

Based on the foregoing descriptions, this application provides an extended GBA authentication method and apparatus and a storage medium, including an EAP-based GBA AKA authentication solution and a new key derivation method. In the EAP-based GBA AKA authentication solution, transfer of the B-TID and the key lifetime is added to the foregoing EAP AKA authentication or EAP AKA' authentication, so that UE and a BSF complete GBA AKA authentication based on an EAP. In addition, there are a plurality of authentication methods that support the EAP, for example, an evolved protocol of EAP AKA or EAP AKA', EAP-TLS, EAP PSK, or EAP IKEv2. For the foregoing authentication method or procedure, an authentication function of GBA may be implemented by using a procedure of adding the B-TID and the key lifetime. In addition, a key shared by both parties after negotiation is performed by using the foregoing authentication method may be alternatively used as Ks, or Ks may be obtained after further derivation. For GBA extension of the EAP, only an EAP AKA procedure is described below as an example.

In addition, because the B-TID and the key lifetime are two parameters, this application supports three processing and distribution manners: a processing and distribution manner for the B-TID, a processing and distribution manner for the key lifetime, and a processing and distribution manner for the B-TID and the key lifetime. A procedure for both the B-TID and the key lifetime is described below. For another procedure of processing and distributing the B-TID, a part related to the key lifetime in the following procedure is removed. This is not additionally described herein. For another procedure of processing and distributing the key lifetime, a part related to the B-TID in the following procedure is removed. This is not additionally described herein.

To be compatible with the existing EAP AKA authentication procedure, an EAP-based GBA AKA authentication solution provided in this application still mainly includes three entities: a peer, an authenticator, and an EAP server.

Figure 4:
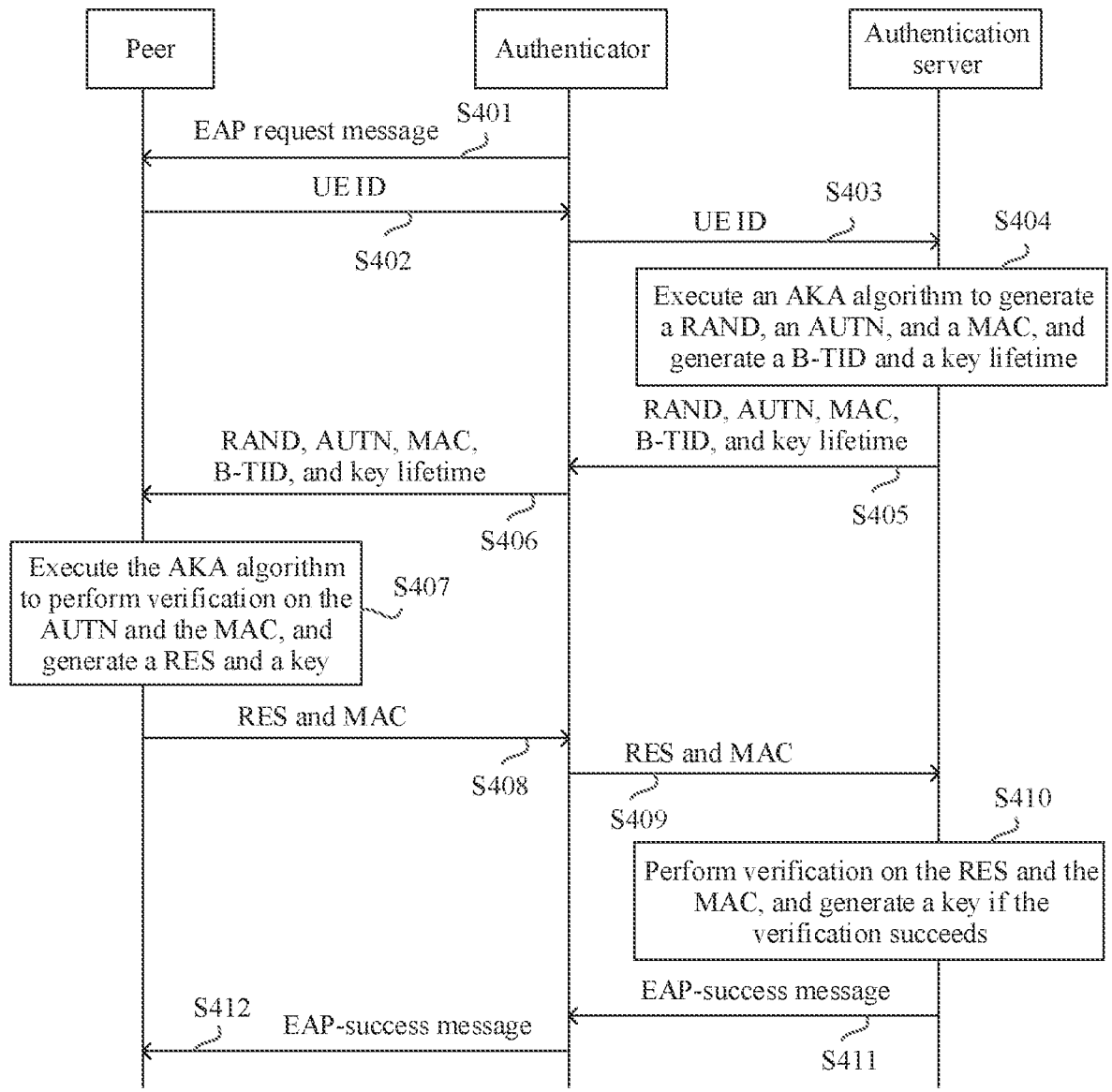
FIG. 4 is a flowchart of an extended authentication method for a generic bootstrapping architecture according to an embodiment of this application.

FIG. 4 is a flowchart of an extended authentication method for a generic bootstrapping architecture according to an embodiment of this application. As shown in FIG. 4, the method includes the following steps.

S401: An authenticator sends an EAP request message to a peer.

The EAP request message is used to request an identifier of the peer.

Correspondingly, the peer receives the EAP request message, responds to the EAP request message, and performs S402.

It should be noted that S401 is an optional step. In the following embodiments, this step may be omitted, in other words, an entire GBA authentication procedure may start from S402.

S402: The peer sends a UE ID to the authenticator.

Optionally, the UE ID may be a permanent ID or a temporary ID, and includes but is not limited to any one of the following identifiers that can uniquely identify UE: a subscription permanent identifier (SUPI), a subscription concealed identifier (SUCI), an international mobile subscriber identity (IMSI), an IP multimedia private identity (IMPI), a temporary IP multimedia private ID (TMPI), a globally unique temporary identity (GUTI), a temporary mobile station identity (TMSI), an IP multimedia public identity (IMPU), an application identifier (App ID), a network identifier (network ID), a service identifier (service ID), and a NAI. For example, if the UE is a server network element, the UE ID may be a server ID. If the UE ID is an encrypted identifier, such as the SUCI, an EAP server may subsequently decrypt the UE ID to obtain an unencryryted identifier of the UE, such as the SUPI. Alternatively, the UE ID is sent to another network element, and an unencrypted identifier such as the SUPI of the UE is obtained from another network element.

Correspondingly, the authenticator receives the UE ID, and performs S403.

S403: The authenticator sends the UE ID to the EAP server.

Correspondingly, the EAP server receives the UE ID, and performs S404.

S404: The EAP server executes an AKA algorithm to generate a RAND, an AUTN, and a MAC, and generates a B-TID and a key lifetime.

The key lifetime represents a lifetime of a subsequently generated key Ks. The B-TID is a bootstrapping transaction identifier, in other words, a bootstrapping transaction ID. Optionally, the B-TID may also be referred to as a transaction ID, an identification ID, a first ID, a GBA session ID, or another name.

Optionally, a manner in which the EAP server executes the AKA algorithm to obtain the RAND, the AUTN, and the MAC is not limited. For example, the EAP server may obtain a related authentication vector from another network element, and the authentication vector includes the RAND, the AUTN, and the MAC. Alternatively, the EAP server executes the AKA algorithm to generate the RAND, the AUTN, and the MAC.

Optionally, a function of the B-TID is that a BSF address and/or the key Ks can be determined based on the B-TID.

Optionally, content of MAC integrity protection includes the B-TID and the key lifetime.

S405: The EAP server sends the RAND, the AUTN, the MAC, the B-TID, and the key lifetime to the authenticator.

Optionally, the EAP server adds the RAND, the AUTN, the MAC, the B-TID, and the key lifetime to a message such as an AKA-challenge message requested by an EAP and sends the message. A specific name of the message that carries the RAND, the AUTN, the MAC, the B-TID, and the key lifetime is not limited in this application.

Correspondingly, the authenticator receives the RAND, the AUTN, the MAC, the B-TID, and the key lifetime and performs S406.

S406: The authenticator sends the RAND, the AUTN, the MAC, the B-TID, and the key lifetime to the peer.

Correspondingly, the peer receives the RAND, the AUTN, the MAC, the B-TID, and the key lifetime and performs S407.

S407: The peer executes the AKA algorithm to perform verification on the AUTN and the MAC and generates a RES and a key.

S408: The peer sends the RES and the MAC to the authenticator.

Optionally, the peer adds the RES and the MAC to a message such as an AKA-challenge message of an EAP-response and sends the message to the authenticator. A specific name of the message that carries the RES and the MAC is not limited in this application.

Correspondingly, the authenticator receives the RES and the MAC and performs S409.

S409: The authenticator sends the RES and the MAC to the EAP server.

Correspondingly, the EAP server receives the RES and the MAC and performs S410.

S410: The EAP server performs verification on the RES and the MAC and the EAP server generates a key if the verification succeeds.

S411: The EAP server sends an EAP-success message to the authenticator.

Correspondingly, the authenticator receives the EAP-success message and performs S412.

S412: The authenticator sends the EAP-success message to the peer.

Correspondingly, the peer receives the EAP-success message and GBA AKA authentication is completed.

In this embodiment, the B-TID and the key lifetime are distributed in a GBA AKA authentication process by using S401 to S412, so that a parameter required by GBA AKA authentication in EAP AKA is transferred, and EAP-based GBA authentication is implemented. In addition, the peer shares a key with the EAP server.

Optionally, a MAC-related operation in all embodiment procedures in this application is optional. In some implementations, the MAC may not be calculated, sent, or verified.

Optionally, in all embodiment procedures in this application, if the authenticator only receives a message and sends a message, an authenticator network element may be not deployed in some implementations.

Optionally, to be applicable to any embodiment of this application in which the key is generated by the EAP server, the EAP server may generate the key in the following manner. A specific derivation formula is as follows:

Ks is a key generated by the EAP server in an authentication process. For example, Ks=CK∥IK; or Ks=EMSK, where EMSK is an extended master session key; or Ks=MSK, where MSK is a master session key.

Alternatively, a key Ks is generated based on a key generated in an authentication process, for example, at least one of CK∥IK, an EMSK, and an MSK. For example:

Ks=KDF (basic key), where KDF represents a key derivation function; or
Ks=KDF (basic key, BSF ID); or
Ks=KDF (basic key, SN ID), where SN represents a serving network ID; or
Ks=KDF (basic key, SN ID, BSF ID).

The basic key is a key obtained by the EAP server in the authentication process, for example, at least one of the CK∥IK, the EMSK, and the MSK.

The derivation formula may further include an indicator indicating a protocol type, for example, indicating al least one of the following protocol indicators: EAP, EAP AKA, EAP AKA', 5G, 5G AKA, GBA, and 5G GBA.

The derivation formula may further include at least one of the following parameters: the UE ID, a session ID, an EAP server ID, an authenticator ID, an uplink or downlink counter, a sequence number, a nonce, and the like. If the foregoing parameters are parameters owned only by the EAP server, the parameters need to be sent to the peer, for example, the session ID, the EAP server ID, the authenticator ID, the uplink or downlink counter, the sequence number, or the nonce.

In the derivation formula, CK∥IK represents cascading of the CK and the IK. The BSF ID may be generated by the EAP server, or the BSF ID is received from the peer.

Optionally, to be applicable to any embodiment of this application in which the key is generated by the peer, the peer may generate the key in the following manner. A specific derivation formula is as follows:

Ks is a key generated by the peer in an authentication process, for example CK∥IK; or Ks=EMSK; or Ks=MSK.

Alternatively, a key Ks is generated based on a key generated in an authentication process, for example, at least one of CK∥IK, an EMSK, and an MSK. For example:
Ks=KDF (basic key); or
Ks=KDF (basic key, BSF ID); or
Ks=KDF (basic key, SN ID); or
Ks=KDF (basic key, SN ID, BSF ID).

The basic key is a key obtained by the peer in the authentication process, for example, at least one of the CK∥IK, the EMSK, and the MSK.

The derivation formula may further include an indicator indicating a protocol type, for example, indicating at least one of the following protocol indicators: EAP, EAP AKA, EAP AKA', 5G, 5G AKA, GBA, and 5G GBA.

The derivation formula may further include at least one of the following parameters: the UE ID, a session ID, an EAP server ID, an authenticator ID, an uplink or downlink counter, a sequence number, a nonce, and the like. If the foregoing parameters are parameters owned only by the peer, the parameters need to be sent to the EAP server, for example, the session ID, the EAP server ID, the authenticator ID, the uplink or downlink counter, the sequence number, or the nonce.

In the derivation formula, CK∥IK represents cascading of the CK and the IK. The BSF ID may be generated by the peer, or the BSF ID is received from the BSF.

Optionally, to be applicable to any embodiment of this application in which the key is generated by the authenticator, the EAP server may not generate the key Ks, and the authenticator generates the key Ks in the following manner. A specific derivation formula is as follows:

Ks is a key generated by the EAP server and sent to the authenticator in an authentication process. For example, Ks=CK∥IK or Ks=EMSK; or Ks=MSK.

Alternatively, the authenticator generates the key Ks based on the key received from the EAP server, for example, at least one of CK∥IK, EMSK, and MSK. For example:
Ks=KDF (basic key); or
Ks=KDF (basic key); or
Ks=KDF (basic key); or
Ks=KDF (basic key, SN BSF ID).

The basic key is a key obtained by the authenticator in the authentication process, for example, at least one of the CK∥IK, the EMSK, and the MSK.

The derivation formula may further include an indicator indicating a protocol type, for example, indicating at least one of the following protocol indicators: EAP, EAP AKA, EAP AKA', 5G, GBA, and 5G GBA.

The derivation formula may further include at least one of the following parameters: the UE ID, a session ID, an uplink or downlink counter, a sequence number, a nonce, and the like. If the nonce is a parameter selected by the authenticator, the nonce needs to be sent to the peer.

The derivation formula may further include at least one of the following parameters: the UE ID, a session ID, an EAP server ID, an authenticator ID, an uplink or downlink counter, a sequence number, a nonce, and the like. If the foregoing parameters are parameters owned only by the authenticator, the parameters need to be sent to the peer, for example, the session ID, the EAP server ID, the authenticator ID, the uplink or downlink counter the sequence number, or the nonce.

In the derivation formula, CK∥IK represents cascading of the CK and the IK. The BSF ID may be generated by the BSF, or the BSF ID is received from the peer.

Optionally, for all embodiments of this application, a location at which the peer derives Ks may be any step after the message from the authenticator is received. A location at which the EAP server derives Ks may be any step after the message from the authenticator is received. A location at which the authenticator derives Ks may be any step after the message from the EAP server is received. Therefore, a specific location for deriving the key is not limited.

To be applicable to any embodiment of this application in which the EAP server generates the B-TID, that the EAP server generates the B-TID may include: The EAP server generates the B-TID based on a RAND and a BSF server name, namely, base64encode(RAND)@BSF_servers_domain_name, where base64encode(RAND) means to perform Base64 encoding conversion on the RAND.

Alternatively, that the EAP server generates the B-TID may include: The EAP server generates an identifier, and uses the identifier as the B-TID. A specific manner of generating the identifier is not limited in this application, and may include but is not limited to random selection.

Because transfer of the B-TID and the key lifetime is added in the foregoing embodiment, an existing message format of the EAP is modified. The existing message format of the EAP is briefly described below.

A message (EAP-Request/AKA-Challenge (AT_RAND, AT_AUTN, AT_MAC)) shown in FIG. 5A is used as an example for explanation.

Code indicates an EAP-request message, an EAP-response message, an EAP-success message, or an EAP failure message. Specifically:
Code=1 (Request), Code=2 (Response), Code=3 (Success), Code=4 (Failure).

In this example, when Code is 1, Code represents an EAP-request, and so on.

Identifier indicates association between a request message and a response message.

Length indicates a length of a packet.

Type indicates a protocol type, such as EAP AKA authentication.

Subtype indicates a subtype, such as an AKA-challenge message type.

In addition, attribute information of the message is further included. In this example, an attribute value includes AT_RAND, AT_AUTN, and AT_MAC.

A format of the attribute information is shown in FIG. 5B.

Attribute type is an attribute type, for example, indicates an AT_RAND parameter type.

Length is an attribute length, and includes an attribute type, a length, and a value.

Value is an attribute value, in other words, a specific parameter, AT_RAND indicates a specific RAND parameter value.

Based on the foregoing descriptions, a message format of the B-TID may be represented as the following format:
a format 1 shown in FIG. 6A; or
a format 2 shown in FIG. 6B.

Length represents a length of the entire message, and includes (AT_B-TID, length, B-TID length, B-TID), and B-TID length is a length of content of the B-TID.

Similar to the message format of the B-TID, a message format of the key lifetime may be represented as follows:
a format 1 shown in FIG. 7A; or
a format 2 shown in FIG. 7B.

Length represents a length of the entire message, and includes (AT_Key lifetime, length, Key lifetime length, Key lifetime), and Key lifetime length is a length of content of the key lifetime.

Figure 8:
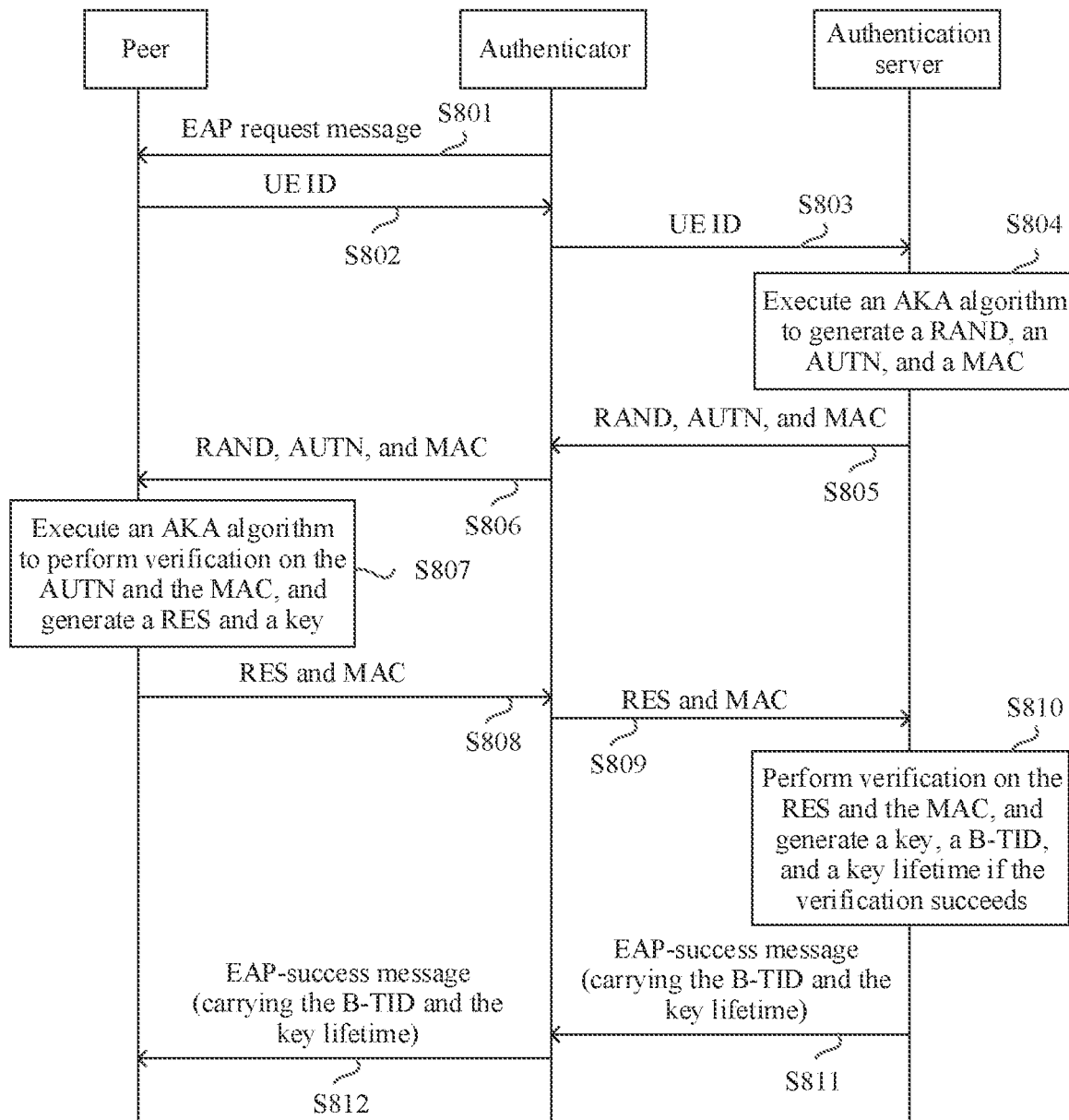
FIG. 8 is a flowchart of an extended authentication method for a generic bootstrapping architecture according to another embodiment of this application.

FIG. 8 is a flowchart of an extended authentication method for a generic bootstrapping architecture according to another embodiment of this application. As shown in FIG. 8, the method includes the following steps.

S801: An authenticator sends an EAP request message to a peer.

S802: The peer sends a UE ID to the authenticator.

S803: The authenticator sends the UE ID to an EAP server.

S801 to S803 are respectively similar to S401 to S403, and details are not described herein.

S804: The EAP server executes an AKA algorithm to generate a RAND, an AUTN, and a MAC.

S805: The EAP server sends the RAND, the AUTN, and the MAC to the authenticator.

Optionally, the EAP server adds the RAND, the AUTN, and the MAC to a message such as an AKA-challenge message requested by an EAP, and sends the message. A specific name of the message that carries the RAND, the AUTN, and the MAC is not limited in this application.

Correspondingly, the authenticator receives the RAND, the AUTN, and the MAC, and performs S806.

S806: The authenticator sends the RAND, the AUTN, and the MAC to the peer.

Correspondingly, the peer receives the RAND, the AUTN, and the MAC, and performs S807.

S807: The peer executes an AKA algorithm to perform verification on the AUTN and the MAC, and generates a RES and a key.

S808: The peer sends the RES and the MAC to the authenticator.

Optionally, the peer adds the RES and the MAC to a message such as an AKA-challenge message of an EAP-response, and sends the message to the authenticator. A specific name of the message that carries the RES and the MAC is not limited in this application.

Correspondingly, the authenticator receives the RES and the MAC, and performs S809.

S809: The authenticator sends the RES and the MAC to the EAP server.

Correspondingly, the EAP server receives the RES and the MAC, and performs S810.

S810: The EAP server performs verification on the RES and the MAC, and the EAP server generates a key, a B-TID, and a key lifetime if the verification succeeds.

For descriptions of the key lifetime and the B-TID, refer to the embodiment corresponding to FIG. 4.

S811: The EAP server sends an EAP-success message to the authenticator.

The EAP-success message carries the B-TID and the key lifetime.

Correspondingly, the authenticator receives the EAP-success message, and performs S812.

S812: The authenticator sends the EAP-success message to the peer.

Correspondingly, the peer receives the EAP-success message, and GBA AKA authentication is completed.

A difference between a procedure shown in FIG. 8 and a procedure shown in FIG. 4 lies in that in the procedure shown in FIG. 4, the AKA-challenge message requested by the EAP carries the B-TID and the key lifetime, and in the procedure shown in FIG. 8, the EAP-success message carries the B-TID and the key lifetime.

In this embodiment, the B-TID and the key lifetime are distributed in a GBA AKA authentication process by using S801 to S812, so that a parameter required by GBA AKA authentication in EAP AKA is transferred, and EAP-based GBA authentication is implemented. In addition, the peer shares a key with the EAP server.

Optionally, similar to the foregoing embodiment, in this embodiment, content of an existing EAP-success message is extended, and fields of the B-TID and the key lifetime are added.

In the prior art, a field format of an EAP-success message is shown in FIG. 9. As shown in FIG. 9, an existing EAP-success message includes three fields: Code, Identifier, and Length. Code indicates a success or a failure. Specifically, Code=3 (Success) and Code=4 (Failure). The existing EAP-success message does not support transfer of another field or a message. In this embodiment of this application, the existing EAP-success message is modified. For example, a field is added after the existing EAP-success message to transfer the B-TID and the key lifetime. Added content is shown in FIG. 6A, FIG. 6B, or FIG. 6A and FIG. 6B.

A field format used to transfer the B-TID may be represented as the following format:

a format 1 shown in FIG. 7A; or a format 2 shown in FIG. 7B.

Length represents a length of the entire message, and includes (AT_B-TID, length, B-TID length, B-TID), and B-TID length is a length of content of the B-TID.

Similar to the field format used to transfer the B-TID, a field format used to transfer the key lifetime may be represented as follows:

a format 1 shown in FIG. 7A; or a format 2 shown in FIG. 7B.

Length represents a length of the entire message, and includes (AT_Key lifetime, length, Key lifetime length, Key lifetime), and Key lifetime length is a length of content of the key lifetime.

Figure 10:
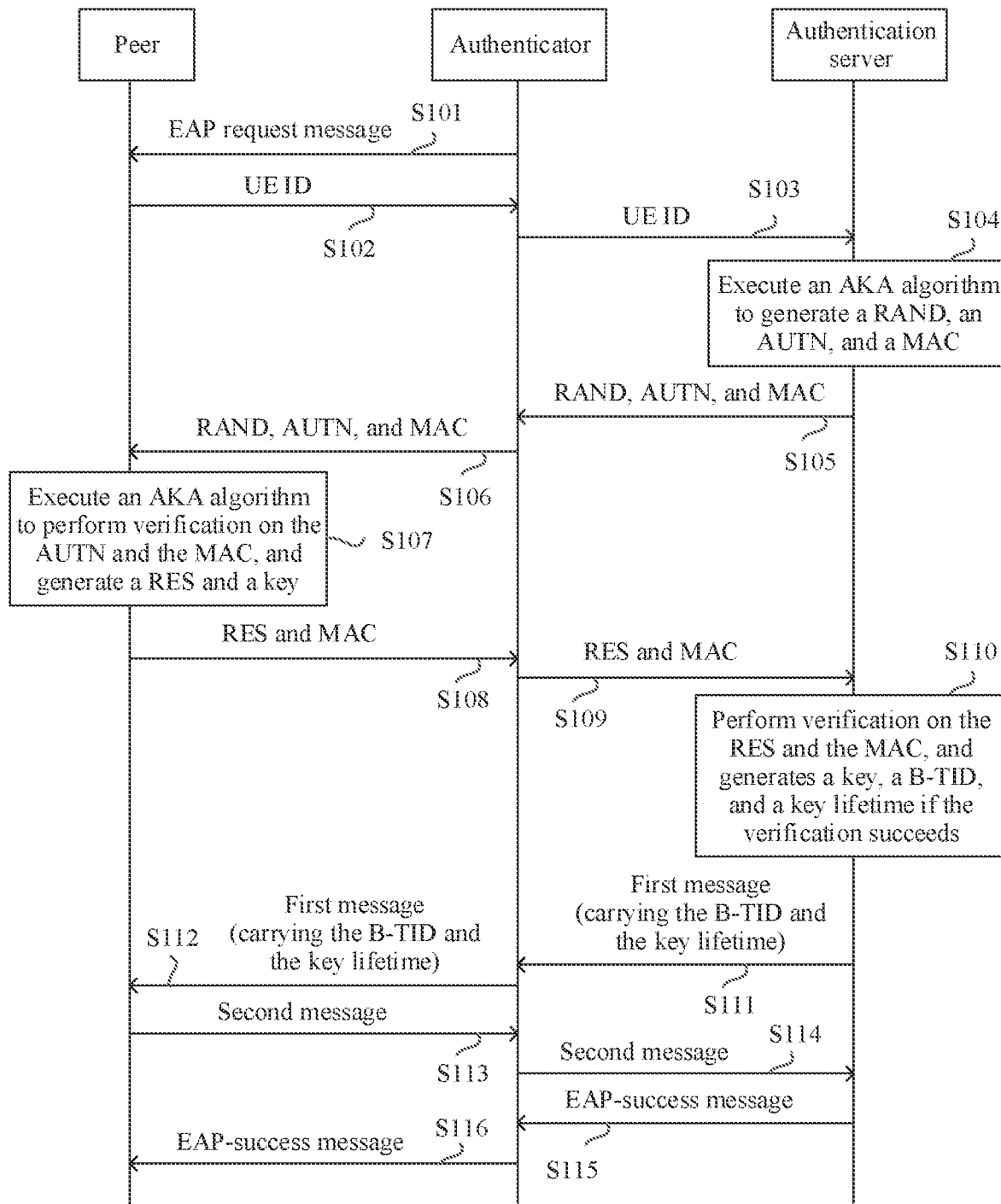
FIG. 10 is a flowchart of an extended authentication method for a generic bootstrapping architecture according to still another embodiment of this application.

FIG. 10 is a flowchart of an extended authentication method for a generic bootstrapping architecture according to still another embodiment of this application. As shown in FIG. 10, the method includes the following steps.

S101: An authenticator sends an EAP request message to a peer.

S102: The peer sends a UE ID to the authenticator.

S103: The authenticator sends the UE ID to an EAP server.

S101 to S103 are respectively similar to S401 to S403, and details are not described herein.

S104: The EAP server executes an AKA algorithm to generate a RAND, an AUTN, and a MAC.

S105: The EAP server sends the RAND, the AUTN, and the MAC to the authenticator.

Optionally, the EAP server adds the RAND, the AUTN, and the MAC to a message such as an AKA-challenge message requested by an EAP, and sends the message. A specific name of the message that carries the RAND, the AUTN, and the MAC is not limited in this application.

Correspondingly, the authenticator receives the RAND, the AUTN, and the MAC, and performs S106.

S106: The authenticator sends the RAND, the AUTN, and the MAC to the peer.

Correspondingly, the peer receives the RAND, the AUTN, and the MAC, and performs S107.

S107: The peer executes the AKA algorithm to perform verification on the AUTN and the MAC, and generates a RES and a key.

S108: The peer sends the RES and the MAC to the authenticator.

Optionally, the peer adds the RES and the MAC to a message such as an AKA-challenge message of an EAP-response, and sends the message to the authenticator. A specific name of the message that carries the RES and the MAC is not limited in this application.

Correspondingly, the authenticator receives the RES and the MAC, and performs S109.

S109: The authenticator sends the RES and the MAC to the EAP server.

Correspondingly, the EAP server receives the RES and the MAC, and performs S110.

S110: The EAP server performs verification on the RES and the MAC, and the EAP server generates a key, a B-TID, and a key lifetime if the verification succeeds.

For descriptions of the key lifetime and the B-TID, refer to the embodiment corresponding to FIG. 4.

S111: The EAP server sends a first message to the authenticator.

The first message carries the B-TID and the key lifetime. Optionally, the first message may be specifically an AKA-notification message of an EAP-request or the like. A specific name of the first message is not limited in this application.

Correspondingly, the authenticator receives the first message, and performs S112.

S112: The authenticator sends the first message to the peer.

Correspondingly, the peer receives the first message, and performs S113.

S113: The peer sends a second message to the authenticator.

The second message may be empty, in other words, does not carry any information. Optionally, the second message may be specifically an AKA-notification message of an EAP-response or the like. A specific name of the second message is not limited in this application.

Correspondingly, the authenticator receives the second message, and performs S114.

S114: The authenticator sends the second message to the EAP server.

Correspondingly, the EAP server receives the second message, and performs S115.

S115: The EAP server sends an EAP-success message to the authenticator.

Correspondingly, the authenticator receives the EAP-success message, and performs S116.

S116: The authenticator sends the EAP-success message to the peer.

Correspondingly, the peer receives the EAP-success message, and GBA AKA authentication is completed.

A difference between a procedure shown in FIG. 10 and a procedure shown in FIG. 4 lies in that in the procedure shown in FIG. 4, the AKA-challenge message requested by the EAP carries the B-TID and the key lifetime, and in the procedure shown in FIG. 10, the first message carries the B-TID and the key lifetime.

In this embodiment, the B-TID and the key lifetime are distributed in a GBA AKA authentication process by using S101 to S116, so that a parameter required by GBA AKA authentication in EAP AKA is transferred, and EAP-based GBA authentication is implemented. In addition, the peer shares a key with the EAP server.

Optionally, similar to the foregoing embodiment, in this embodiment, content of an existing EAP-response message or an existing AKA-notification message is extended and fields of the B-TID and the key lifetime are added. In this embodiment of this application, the existing EAP-response message or the existing AKA-notification message is modified. For example, a field is added after the existing EAP-response message or the existing AKA-notification message to transfer the B-TID and the key lifetime. Added content is shown in FIG. 6A, FIG. 6B, or FIG. 6A and FIG. 6B. For specific explanations, refer to the foregoing embodiment. Details are not described herein.

In some embodiments, a new EAP message may be alternatively defined to transfer the B-TID and the key lifetime. The new EAP message may be a GRA-AKA notification message of the EAP-request, or the like.

In conclusion, in all the foregoing embodiments, the EAP server generates the B-TID and the key lifetime. In an optional solution, the B-TID and the key lifetime may be alternatively generated by the peer. A specific implementation is described and explained by using the following embodiments.

Figure 11:
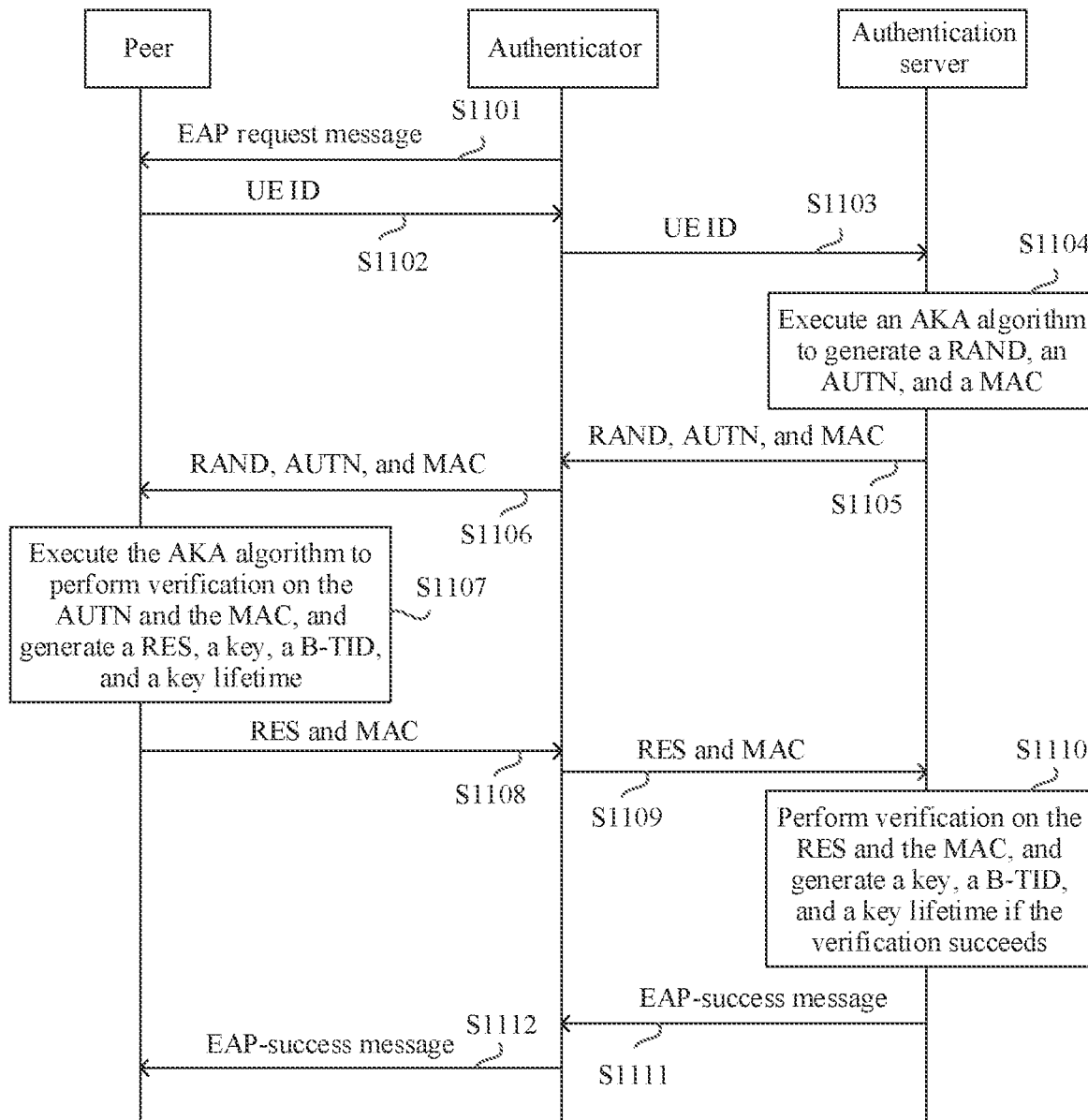
FIG. 11 is a flowchart of an extended authentication method for a generic bootstrapping architecture according to still another embodiment of this application.

FIG. 11 is a flowchart of an extended authentication method for a generic bootstrapping architecture according to still another embodiment of this application. As shown in FIG. 11, the method includes the following steps.

S1101: An authenticator sends an EAP request message to a peer.

S1102: The peer sends a UE ID to the authenticator.

S1103: The authenticator sends the UE ID to an EAP server.

S1101 to S1103 are respectively similar to S401 to S403, and details are not described herein.

S1104: The EAP server executes an AKA algorithm to generate a RAND, an AUTN, and a MAC.

S1105: The EAP server sends the RAND, the AUTN, and the MAC to the authenticator.

Optionally, the EAP server adds the RAND, the AUTN, and the MAC to a message such as an AKA-challenge message requested by an EAP, and sends the message. A specific name of the message that carries the RAND, the AUTN, and the MAC is not limited in this application.

Correspondingly, the authenticator receives the RAND, the AUTN and the MAC, and performs S1106.

S1106: The authenticator sends the RAND, the AUTN, and the MAC to the peer.

Correspondingly, the peer receives the RAND, the AUTN, and the MAC, and performs S1107.

S1107: The peer executes the AKA algorithm to perform verification on the AUTN and the MAC, and generates a RES, a key, a B-TID, and a key lifetime.

For descriptions of the key lifetime and the B-TID, refer to the embodiment corresponding to FIG. 4.

S1108: The peer sends the RES and the MAC to the authenticator.

Optionally, the peer adds the RES and the MAC to a message such as an AKA-challenge message of an EAP-response and sends the message to the authenticator. A specific name of the message that carries the RES and the MAC is not limited in this application.

Correspondingly, the authenticator receives the RES and the MAC and performs S1109.

S1109: The authenticator sends the RES and the MAC to the EAP server.

Correspondingly, the EAP server receives the RES and the MAC and performs S1110.

S1110: The EAP server performs verification on the RES and the MAC and the EAP server generates a key, a B-TID, and a key lifetime if the verification succeeds.

S1111: The EAP server sends an EAP-success message to the authenticator.

Correspondingly, the authenticator receives the EAP-success message and performs S1112.

S1112: The authenticator sends the EAP-success message to the peer.

Correspondingly, the peer receives the EAP-success message, and GBA AKA authentication is completed.

A difference between a procedure shown in FIG. 11 and a procedure shown in FIG. 4 lies in that in the procedure shown in FIG. 4, the B-TID and the key lifetime are generated by the EAP server and sent to the UE, and in the procedure shown in FIG. 11, the B-TID and the key lifetime are respectively generated by the peer and the EAP server.

Optionally, in all embodiment procedures in this application, a location at which the EAP server generates the B-TID and the key lifetime is not limited, and a location at which the peer generates the B-TID and the key lifetime is not limited.

In this embodiment, the B-TID and the key lifetime are obtained in a GBA AKA authentication process by using S1101 to S1112, so that a parameter required by GBA AKA authentication in EAP AKA is obtained, and EAP-based GBA authentication is implemented. In addition, the peer shares a key with the EAP server.

In some embodiments, that the peer generates the B-TID may include: generating the B-TID based on the RAND and a BSF server name. Specifically, the peer receives the RAND by using S1106, in other words, for the RAND, the peer obtains the RAND during authentication. For the BSF server name, there are the following possibilities:

Possibility 1: In an authentication process, the EAP server or the authenticator sends the BSF server name to the peer. For example, the BSF server name is added to an EAP-request/identity message or an EAP request/AKA-challenge message and is sent by the EAP server or the authenticator to the peer.

Correspondingly, the peer receives the BSF server name sent by the EAP server or the authenticator.

Optionally, a BSF server ID may be alternatively sent herein. By using the BSF server ID, the peer may obtain the BSF server name.

Possibility 2: By using an operator identifier, the peer may obtain the BSF server name such as BSF.operator.com or BSF server.operater.com by using some determined rules. The operator herein may be the operator identifier.

Possibility 3: The peer generates the BSF server name based on identifiers of the peer in different scenarios. For example, the peer generates the BSF server name based on an IMSI in a universal subscriber identity module (USIM) scenario; or the peer generates the BSF server name based on an IMPI in an IP multimedia service identity module (ISIM) scenario.

In some embodiments, that the peer generates the key lifetime has the following possibilities.

Possibility 1: In an authentication process, the EAP server or the authenticator sends the key lifetime to the peer. For example, the key lifetime is added to an EAP-request/identity message or an EAP request/AKA-challenge message and is sent by the EAP server or the authenticator to the peer.

Correspondingly, the peer receives the key lifetime sent by the EAP server or the authenticator.

Possibility 2: The peer has preset the key lifetime, or the peer has obtained the key lifetime before authentication.

The peer generates the B-TID based on the RAND and the BSF server name. Optionally, based on the foregoing embodiment, a specific location of generating any one or more of the B-TID, the key lifetime, and a key Ks is not limited in this application.

It should also be noted that, the B-TID and the key lifetime may be generated by the peer or the EAP server.

In a possible implementation, the B-TID may be generated by the EAP server, and the key lifetime may be generated by the peer. Accordingly, only the B-TID is transmitted in a subsequent step.

In another possible implementation, the key lifetime may be generated by the EAP server and the B-TID may be generated by the peer. Accordingly, only the key lifetime is transmitted in a subsequent step.

In a possible implementation, the peer may generate the B-TID and the key lifetime, and the peer sends the B-TID and the key lifetime to the EAP server.

It should be additionally noted that, existing EAP AKA authentication includes the following:

If the peer does not require that a success notification message be protected, a success indication is directly sent to the peer by using the EAP-success message. Alternatively, if the peer requires that a success notification message be protected, a BSF sends a success indication to the peer by using an AKA-notification message.

Therefore, a corresponding method for distributing the B-TID and the key lifetime in this application is as follows:

If the peer does not require that a success notification message be protected, the BSF may send the B-TID and the key lifetime by using the EAP-success message. Alternatively, if the peer requires that a success notification message be protected, the BSF may send the B-TID and the key lifetime by using the first message. The BSF herein may be the EAP server or the authenticator.

In the foregoing embodiment, the B-TID is generated based on the RAND and the BSF server name. For generation of the B-TID, another possibility is further included. To be specific, a first half of the B-TID is an identifier randomly selected by the BSF, and the BSF sends the B-TID and the key lifetime to the peer. For a specific manner of distributing the B-TID and the key lifetime, refer to the foregoing embodiments. The B-TID includes two parts of content: One part is a RAND random number, and the other part is a BSF server domain name. In other words, the B-TID is base64encode(RAND)@BSF_servers_domain_name.

Therefore, random selection herein means that, instead of using the RAND parameter in the authentication process, the BSF randomly selects a random number as the first half of the B-TID.

Subsequently, the peer may send the B-TID to a NAF to request to perform authentication between the peer and the NAF. After the NAF sends the B-TID to the BSF, the BSF determines a corresponding key based on a stored B-TID and performs a subsequent procedure such as NAF key generation.

In the prior art, a GBA technology further includes key negotiation of K_NAF between the UE and the NAF, and participants include the UE, the NAF, and the BSF. A basic procedure of key negotiation of K_NAF between the UE and the NAF is as follows:

1. The UE stores a B-TID and a key Ks. The UE first generates Ks_NAF, and then initiates an application request to the NAF, where the application request carries the B-TID and another msg message.

2. The NAF sends the B-TID and a NAF-ID to the BSF.

3. The BSF determines a key Ks based on the B-TID, generates Ks_NAF, and sends Ks_NAF, a key lifetime, and the like to the NAF.

4. The NAF sends an application response to the UE.

How the UE obtains the B-TID after the foregoing authentication is mainly completed above, and a key is shared with the NAF. Subsequently, a secure channel may be established between the UE and the NAF by using a secure method such as TLS.

Referring to the foregoing prior art, this embodiment of this application provides an EAP-based authentication manner between the UE and the NAF. For example, it may be assumed that the B-TID is a user name and Ks_ANF is a password. In this way, authentication methods such as EAP-POTP, EAP-PSK, and EAP-PWD are supported.

An EAP-PSK procedure is described below as an example. A specific implementation is as follows: The UE performs the EAP-PSK procedure.

1. The UE replaces a user name in an authentication message with the B-TID, replaces a password in the authentication message with Ks_NAF, and sends a modified authentication message to the NAF.

2. After receiving the authentication message sent by the UE, the NAF checks whether the user name and the password that are stored in the authentication message are consistent with a user name and a password that are sent by the UE. If the user name and the password that are stored in the authentication message are consistent with the user name and the password that are sent by the UE, the check succeeds. Otherwise, the check fails.

A current 5G architecture includes the following security network elements: an authentication server function (AUSF), an authentication credential repository and processing function (ARPF), and a security anchor function (SEAF). The foregoing network element may also play a role of the BSF, or generate Ks and send Ks to the BSF. This embodiment differs from the foregoing embodiment mainly in that a specific implementation of generating the key is different. Specific generation of the B-TID and the key lifetime is not limited herein. This may be compatible with a method used by the BSF to generate the B-TID and the key lifetime and distribute the B-TID and the key lifetime to the UE, and a manner in which the UE generates the B-TID and the key lifetime in the foregoing embodiment.

In an implementation, an ARPF generates Ks based on an EMSK, an MSK, or CK∥IK, and sends Ks to the BSF. For a specific derivation formula, refer to a method for generating Ks in the embodiment corresponding to FIG. 4. A specific operation of the UE includes: generating Ks based on a key in an authentication process.

Figure 12:
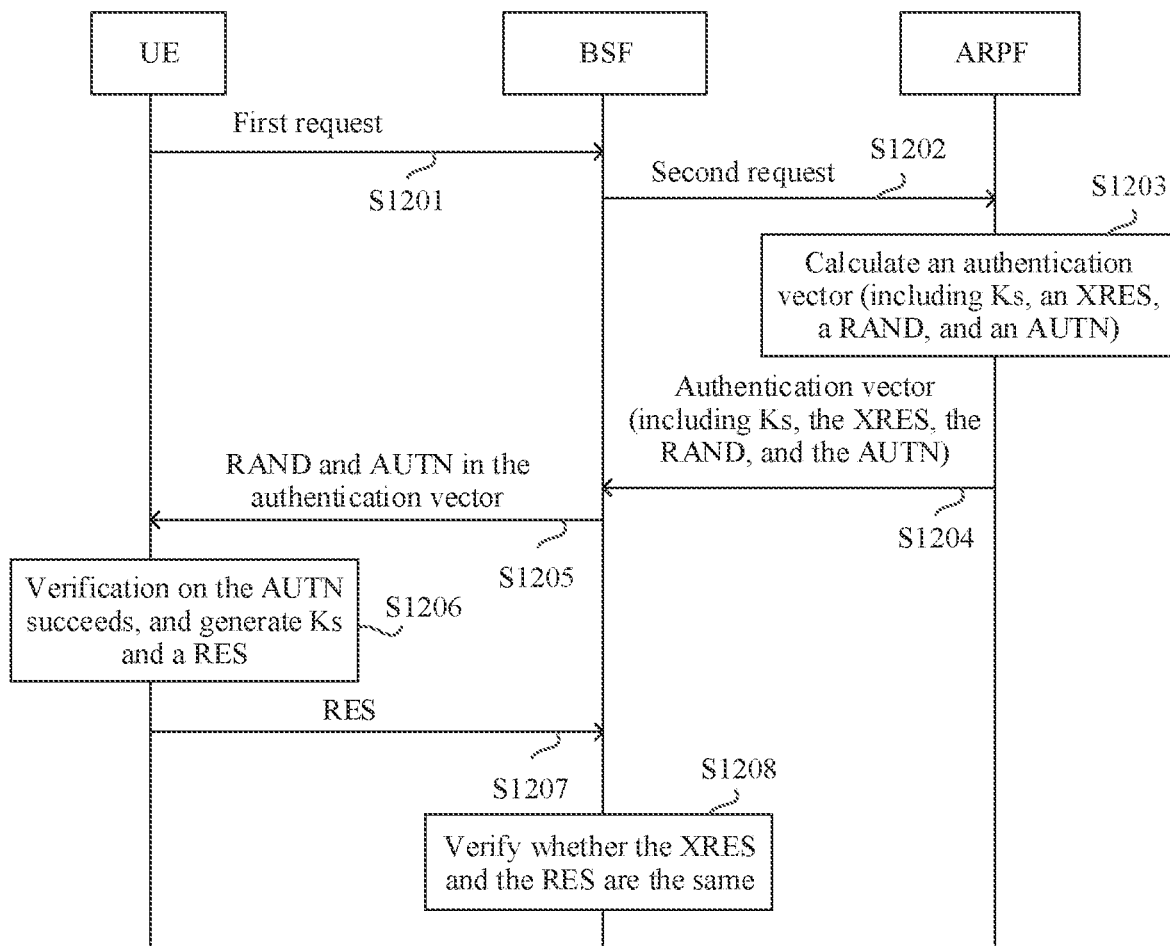
FIG. 12 is a flowchart of an extended authentication method for a generic bootstrapping architecture according to still another embodiment of this application.

FIG. 12 is a flowchart of an extended authentication method for a generic bootstrapping architecture according to still another embodiment of this application. As shown FIG. 12, the method may include the following steps.

S1201: UE sends a first request to a BSF.

The first request includes a UE ID.

Correspondingly, the BSF receives the first request, adds a BSF ID to the first request to form a second request, and performs S1202. In other words, the second request includes the UE ID and the BSF ID.

S1202: The BSF sends the second request to an ARPF.

Correspondingly, the ARPF receives the second request, and performs S1203.

S1203: The ARPF calculates an authentication vector.

The authentication vector includes Ks, an XRES, a RAND, and an AUTN.

S1204: The ARPF sends the authentication vector to the BSF.

Correspondingly, the BSF receives the authentication vector, and performs S1205.

S1205: The BSF sends the RAND and the AUTN in the authentication vector to the UE.

Correspondingly, the UE receives the RAND and the AUTN, and performs S1206.

S1206: The UE successfully verifies the AUTN, and generates Ks and a RES.

S1207: The UE sends the RES to the BSF.

Correspondingly, the BSF receives the RES and performs S1208.

S1208: The BSF verifies whether the XRES and the RES are the same.

If the XRES and the RES are the same, it indicates that verification performed on the UE succeeds. If the XRES and the RES are not the same, it indicates that the verification performed on the UE fails.

Optionally, if the ARPF does not need the BSF ID when generating Ks, the BSF does not need to send the BSF ID to the ARPF, in other words, the BSF needs to forward only the first request to the ARPF. Alternatively, if the ARPF may obtain the BSF ID in another manner, similarly, the BSF does not need to send the BSF ID to the ARPF, and forwards only the first request to the ARPF.

A manner in which the ARPF obtains the BSF ID is not limited in this application. For example, the ARPF may obtain the BSF ID in any one of the following manners:

Implementation 1: Preset.

Implementation 2: The BSF ID is determined based on a message source.

Implementation 3: The ARPF requests to obtain the BSF ID from the BSF or another network element, and obtains a response, where the response includes the BSF ID.

In the foregoing implementation, the BSF ID may be replaced with a BSF server name.

In another implementation, the ARPF sends a first key to the BSF, so that the BSF derives Ks based on the first key. The first key herein may be an EMSK, an MSK, or CK∥IK. Alternatively, the first key is generated based on the EMSK, the MSK, or the CK∥IK. For a specific formula and parameter for deriving the first key, refer to a method for generating Ks in the embodiment corresponding to FIG. 4.

For example, a formula used by the BSF to derive Ks based on the first key may be as follows:

Ks=KDF (first key); or

Ks=KDF (first key, BSF ID); or

Ks=KDF (first key, SN ID); or

Ks=KDF (first key, SN ID, BSF ID).

In some embodiments, the derivation formula may further include an indicator indicating a protocol type, for example, indicating at least one of the following protocol indicators: EAP, EAP AKA, EAP AKA', 5G, GBA, and 5G GBA.

In some embodiments, the derivation formula may further include at least one of the following parameters: the UE ID, a session ID, an uplink or downlink counter, a sequence number, a nonce, and the like. If the nonce is a parameter selected by an authenticator, the authenticator needs to send the nonce to the UE.

In some embodiments, the derivation formula may further include at least one of the following parameters: the UE ID, a session ID, an EAP server ID, an authenticator ID, an uplink or downlink counter, a sequence number, a nonce, and the like. If the foregoing parameters are parameters owned only by the ARPF, the ARPF needs to send the parameters to the UE, for example, the session ID, the EAP server ID, the authenticator ID, the uplink or downlink counter, the sequence number, and the nonce.

A specific operation of the UE includes: generating the first key based on a key in an authentication process, and then generating Ks based on the first key.

Figure 13:
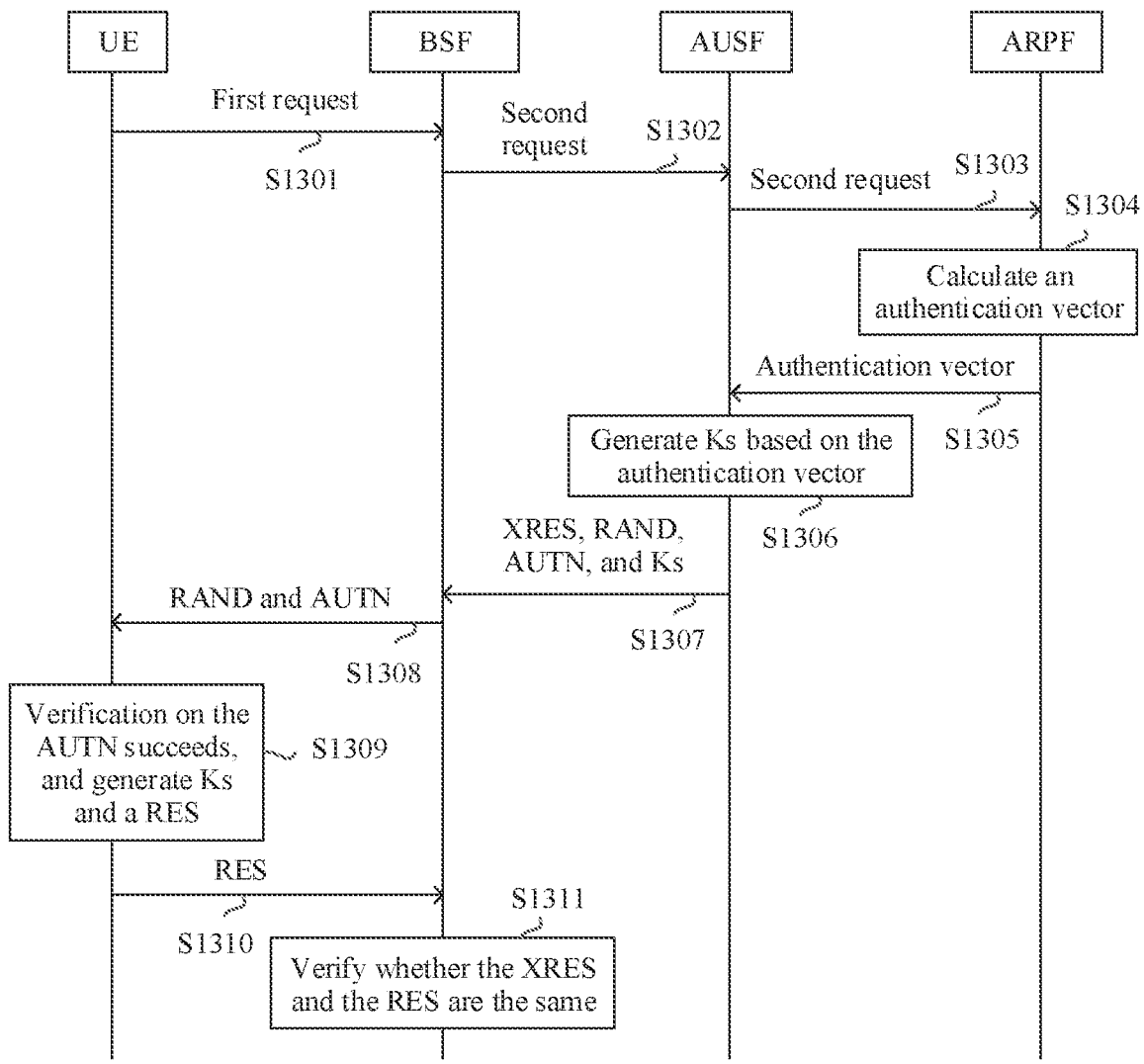
FIG. 13 is a flowchart of an extended authentication method for a generic bootstrapping architecture according to still another embodiment of this application.

FIG. 13 is a flowchart of an extended authentication method for a generic bootstrapping architecture according to still another embodiment of this application. As show a in FIG. 13, the method may include the following steps.

S1301: UE sends a first request to a BSF.

The first request includes a UE ID.

Correspondingly, the BSF receives the first request, adds a BSF ID to the first request to form a second request, and performs S1302. In other words, the second request includes the UE ID and the BSF ID.

S1302: The BST sends the second request to an AUSF.

Correspondingly, the AUSF receives the second request, and performs S1303.

S1303: The AUSF sends the second request to an ARPF.

Correspondingly, the ARPF receives the second request, and performs S1304.

S1304: The ARPF calculates an authentication vector.

The authentication vector includes an XRES, a RAND, an AUTN, and Kausf. Herein, Kasuf represents a key sent by the ARPF to the AUSF. Alternatively, the authentication vector may be an XRES, a RAND, an AUTN, and at least one of an EMSK, an MSK, and CK∥IK.

S1305: The ARPF sends the authentication vector to the AUSF.

Correspondingly, the AUSF receives the authentication vector, and performs S1306.

S1306: The AUSF generates Ks based on the authentication vector.

Optionally, that the AUSF generates Ks based on the authentication vector may include: The AUSF generates Ks based on the CK∥IK; or the AUSF generates Ks based on the EMSK or the MSK; or the AUSF generates Ks based on Kausf.

S1307: The AUSF sends the XRES, the RAND, the AUTN, and Ks to the BSF.

Correspondingly, the BSF receives the XRES, the RAND, the AUTN, and Ks, and performs S1308.

S1308: The BSF sends the RAND and the AUTN to the UE.

Correspondingly, the UE receives the RAND and the AUTN, and performs S1309.

S1309: The UE successfully verifies the AUTN, and generates Ks and a RES.

S1310: The UE sends the RES to the BSF.

Correspondingly, the BSF receives the RES and performs S1311.

S1311: The BSF verifies whether the XRES and the RES are the same.

If the XRES and the RES are the same, it indicates that verification performed on the UE succeeds. If the XRES and the RES are not the same, it indicates that the verification performed on the UE fails.

This embodiment differs from the foregoing embodiment in that there is an interface between the BSF and the AUSF, and the AUSF receives a CK, an IK, the EMSK, the MSK, or Kausf from the ARPF through the interface. The AUSF derives Ks based on the foregoing key. For a specific formula and parameter for deriving Ks, refer to a method for generating Ks in the embodiment corresponding to FIG. 4. A difference lies in that, in addition to the CK∥IK, the MSK, and the EMSK, there is also a possibility of generating Kausf.

Optionally, if the AUSF does not need the BSF ID when generating Ks, the BSF does not need to send the BSF ID to the ARPF, in other words, the BSF needs to forward only the first request to the AUSF. Alternatively, if the AUSF may obtain the BSF ID in another manner, similarly, the BSF does not need to send the BSF ID to the AUSF, and forwards only the first request to the AUSF. A manner in which the AUSF obtains the BSF ID is not limited in this application. For example, the AUSF may obtain the BSF ID in any one of the following manners:

Implementation 1: Preset.

Implementation 2: The BSF ID is determined based on a message source.

Implementation 3: The AUSF requests to obtain the BSF ID from the BSF or another network element, and obtains a response, where the response includes the BSF ID.

In the foregoing implementation, the BSF ID may be replaced with a BSF server name.

In still another implementation, the AUSF sends a second key to the BSF, so that the BSF derives Ks based on the second key. The second key, herein may be an EMSK, an MSK, Kausf, or CK∥IK. Alternatively, the second key is generated based on the EMSK, the MSK, Kausf, or the CK∥IK. For a specific formula and parameter for deriving the second key, refer to a method for generating Ks in the embodiment corresponding to FIG. 4.

For example, a formula used by the BSF to derive Ks based on the second key may be as follows:

Ks=KDF (second key); or

Ks=KDF (second key, BSF ID); or

Ks=KDF (second key, SN ID); or

Ks=KDF (second key, SN ID, BSF ID).

In some embodiments, the derivation formula may further include an indicator indicating a protocol type, for example, indicating at least one of the following protocol indicators: EAP, EAP AKA, EAP AKA', 5G, GBA, and 5G GBA.

In some embodiments, the derivation formula may further include at least one of the following parameters: the UE ID, a session ID, an uplink or downlink counter, a sequence number, a nonce, and the like. If the nonce is a parameter selected by an authenticator, the authenticator needs to send the nonce to the UE.

In some embodiments, the derivation formula may further include at least one of the following parameters: the UE ID, a session ID, an EAP server ID, an authenticator ID, an uplink or downlink counter, a sequence number, a nonce, and the like. If the foregoing parameters are parameters owned only by the AUSF, the AUSF needs to send the parameters to the UE, for example, the session ID, the EAP server ID, the authenticator ID, the uplink or downlink counter, the sequence number, and the nonce.

A specific operation of the UE includes: generating the second key based on a key in an authentication process, and then generating Ks based on the second key.

The BSF ID may be replaced with a BSF server name.

In addition, there is another possibility: There is an interface between the BSF and an SEAF. The SEAF generates Ks; or the SEAF generates a third key and sends the third key to the BSF, so that the BSF generates Ks based on the third key. In addition, if the SEAF does not need the BSF ID when generating Ks, the BSF does not need to send the BSF ID to the SEAF. Alternatively, if the SEAF may obtain the BSF ID in another manner, similarly, the BSF does not need to send the BSF ID to the SEAF. Herein, a manner in which the SEAF obtains the BSF ID may be that the BSF ID is preset, or the BSF ID is determined based on a message source, or the SEAF requests to obtain the BSF ID from the BSF or another network element, and obtains a response, where the response includes the BSF ID, and the like. This is not limited herein.

Another difference between this possible embodiment and the foregoing embodiment is that in a key generation method, the third key is generated based on the EMSK, the MSK, Kseaf, or CK∥IK.

For the foregoing embodiment, there are also the following possibilities:

Possibility 1 (applicable to all embodiments): An authenticator generates a B-TID and a key lifetime and sends the B-TID and the key lifetime to a peer.

Possibility 2 (applicable to all embodiments): That a peer generates Ks may be any step after an EAP-response/AKA-request message sent by an authenticator is received. This is not limited in this application. For example, after receiving an EAP-success message, the peer generates Ks.

Possibility 3 (applicable to all embodiments): That an EAP server generates Ks may be any step after a message sent by an authenticator is received. This is not limited in this application. For example, after receiving an EAP-response/AKA-challenge message, the EAP server generates Ks.

Possibility 4 (applicable to all embodiments): For a specific manner in which a peer generates Ks and a specific manner in which an EAP server generates Ks, refer to the descriptions in the embodiment shown in FIG. 4.

Possibility 5 (applicable to all embodiments): An authenticator generates Ks. For a specific generation manner, refer to the descriptions in the embodiment shown in FIG. 4.

Possibility 6 (applicable to all embodiments): For a correspondence between a network element in an EAP and a GBA network element, there are the following possibilities.

A peer executes an action corresponding to the UE, and an EAP server executes an action corresponding to the BSF. The action herein includes, for example, at least one of the following three actions: authentication, generating Ks, generating the B-TID and the key lifetime.

Alternatively, a peer executes an action corresponding to the UE, and an authenticator executes an action corresponding to the BSF. The action herein includes, for example, at least one of the following three actions: authentication, generating Ks, generating the B-TID and the key lifetime.

Alternatively, the BSF is independently deployed, and there is an interface between the BSF and an authenticator or an EAP server. If the BSF is independently deployed, the UE first accesses the BSF, and then the BSF accesses the authenticator, and the authenticator accesses the EAP server. Alternatively, the UE may first access the authenticator, and then the authenticator accesses the BSF, and the BSF accesses the EAP server.

Possibility 7 (applicable to all embodiments): The CK and the IK mentioned above are represented as a cipher key and an integrity protection, key, and representation symbols are not limited, and may be alternatively represented as CK' and IK'. This is not limited herein.

Possibility 8 (applicable to all embodiments): For a correspondence between an ARPF, an AUSF, an SEAF network element, and a GBA network element, there are the following possibilities.

The ARPF executes an action corresponding to the BSF. The action herein includes, for example, at least one of the following three actions: authentication, generating Ks, generating the B-TID and the key lifetime.

Alternatively, the AUSF executes an action corresponding to the BSF. The action herein includes, for example, at least one of the following three actions: authentication, generating Ks, generating the B-TID and the key lifetime.

Alternatively, the SEAF executes an action corresponding to the BSF. The action herein includes, for example, at least one of the following three actions: authentication, generating Ks, generating the B-TID and the key lifetime.

Possibility 9 (applicable to all embodiments): That the UE or a peer generates Ks may be any step after a message sent by the BSF/ARPF/AUSF/SEAF is received. This is not limited in this application.

Possibility 10 (applicable to all embodiments): That the BSF/ARPF/AUSF/SEAF generates Ks may be any step after a related message sent by the UE or a peer is received. This is not limited in this application.

Possibility 11 (applicable to all embodiments): For a correspondence between an ARPF/AUSF/SEAF network and a GBA network element, there are the following possibilities.

The BSF is independently deployed, and there is an interface between the BSF and the ARPF/AUSF/SEAF. If the BSF is independently deployed, the UE first accesses the BSF, and then the BSF accesses the ARPF/AUSF/SEAF. Alternatively, the UE may first access the SEAF, and then the SEM accesses the BSF, and the BSF accesses the AUSF. Alternatively, the UE may first access the SEAF, and then the SEAF accesses the AUSF, the AUSF accesses the BSF, and the BSF accesses the ARPF. The foregoing combination manner is not limited.

In conclusion, the first network element in this application may be the EAP server, the AUSF, or the like, the terminal may be the peer or the UE, and the second network element may be the authenticator or the like. This is not limited in this application. For a specific example, refer to a subsequent embodiment. In addition, a key generation entity is not limited in this application, and may be the EAP server, the peer, the UE, the AUSF, the authenticator, the ARPF, or the like.

The extended authentication method for a generic bootstrapping architecture according to the embodiments of this application is described in detail above, and an extended authentication apparatus for a generic bootstrapping architecture according to an embodiment of this application is described below.

A schematic structure of the extended authentication apparatus for a generic bootstrapping architecture is described in detail in the embodiments of this application.

Figure 14:
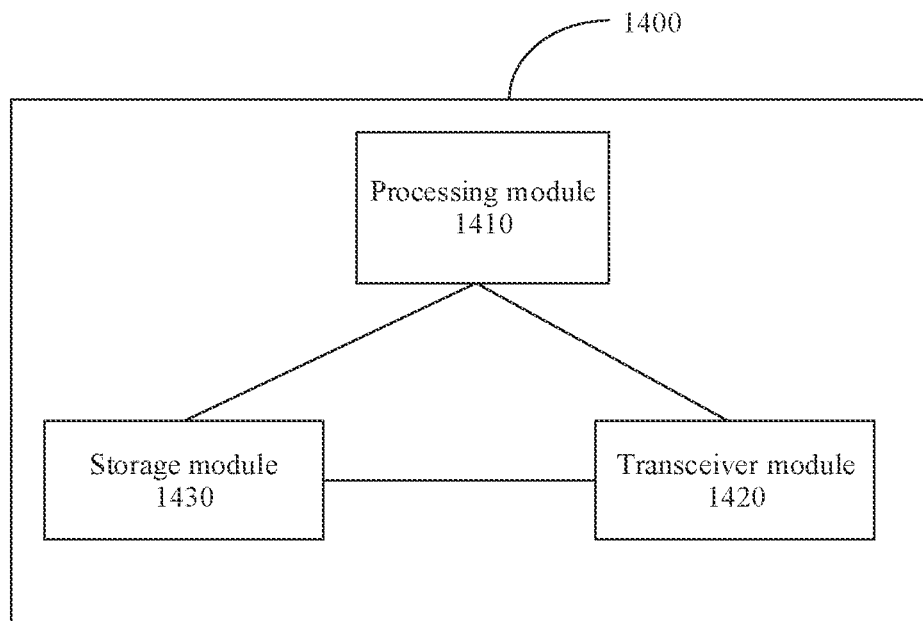
FIG. 14 is a schematic block diagram of an extended authentication apparatus for a generic bootstrapping architecture according to an embodiment of this application.

In an example, FIG. 14 is a schematic block diagram of an extended authentication apparatus for a generic bootstrapping architecture according to an embodiment of this application. An extended authentication apparatus 1400 for a generic bootstrapping architecture in this embodiment of this application may be the first network element in the foregoing method embodiments, or may be one or more chips in the first network element. The extended authentication apparatus 1400 for a generic bootstrapping architecture may be configured to perform some or all functions of the first network element in the foregoing method embodiments. The extended authentication apparatus 1400 for a generic bootstrapping architecture may include a processing module 1410 and a transceiver module 1420. Optionally, the extended authentication apparatus 1400 for a generic bootstrapping architecture may further include a storage module 1430.

For example, the processing module 1410 may be configured to perform the step of generating the B-TID and the key lifetime in the foregoing method embodiments.

The transceiver module 1420 may be configured to perform the step of sending the B-TID and the key lifetime in the foregoing method embodiments.

Alternatively, the extended authentication apparatus 1400 for a generic bootstrapping architecture may be configured as a general processing system, such as a chip. The processing module 1410 may include one or more processors that provide a processing function. The transceiver module 1420 may be, for example, an input/output interface, a pin, or a circuit, and the input/output interface may be configured to be responsible for information exchange between this chip system and the outside. For example, the input/output interface may output, to another module other than the chip for processing, the B-TID and the key lifetime that are generated by the processing module 1410. The processing module 1410 may execute a computer execution instruction stored in the storage module 1430, to implement a function of the first network element in the foregoing method embodiments. In an example, the storage module 1430 optionally included in the extended authentication apparatus 1400 for a generic bootstrapping architecture may be an in-chip storage unit, such as a register or a cache, and the storage module 1430 may be alternatively a storage unit that is in the first network element and that is outside the chip, such as a read-only memory (ROM) or another type of static storage device that can store static information and an instruction, or a random access memory (RAM).

Figure 15:
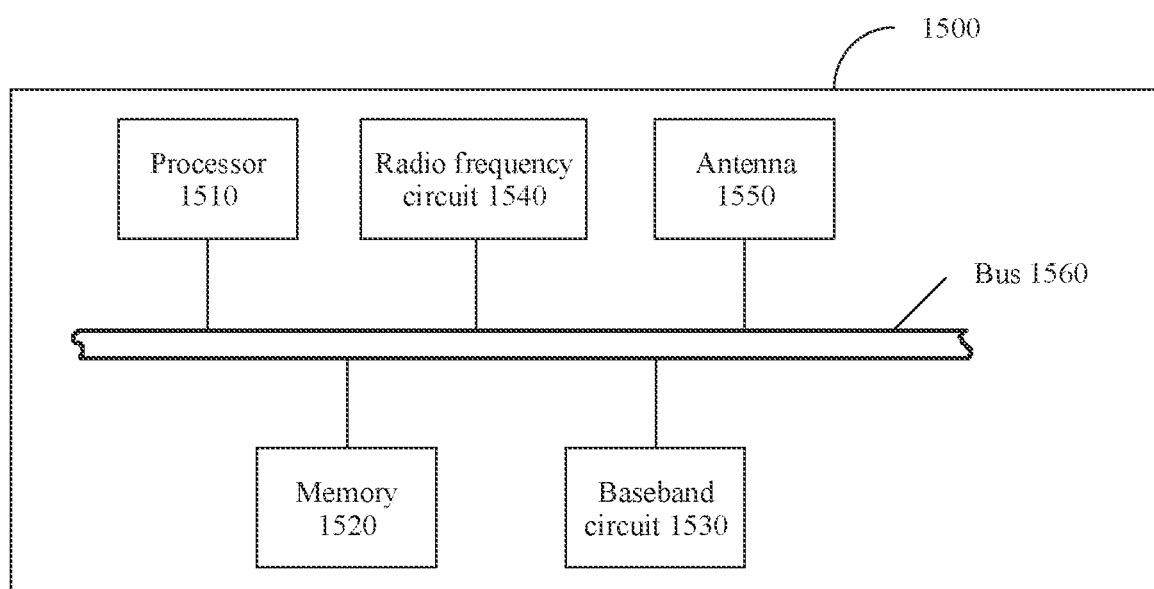
FIG. 15 is a schematic block diagram of an extended authentication apparatus for a generic bootstrapping architecture according to another embodiment of this application.

In another example, FIG. 15 is a schematic block diagram of an extended authentication apparatus for a generic bootstrapping architecture according to another embodiment of this application. An extended authentication apparatus 1500 for a generic bootstrapping architecture in this embodiment of this application may be the first network element in the foregoing method embodiments. The extended authentication apparatus 1500 for a generic bootstrapping architecture may be configured to perform some or all functions of the first network element in the foregoing method embodiments. The extended authentication apparatus 1500 for a generic bootstrapping architecture may include a processor 1510, a baseband circuit 1530, a radio frequency circuit 1540, and an antenna 1550. Optionally, the extended authentication apparatus 1500 for a generic bootstrapping architecture may further include a memory 1520. Components of the extended authentication apparatus 1500 for a generic bootstrapping architecture are coupled by using a bus 1560. In addition to a data bus, a bus system 1560 further includes a power bus, a control bus, and a status signal bus. However, for clear description, various types of buses in the figure are marked as the bus system 1560.

The processor 1510 may be configured to control a first network element and is configured to perform processing performed by the first network element in the foregoing embodiments. The processor 1510 may perform a processing process related to the first network element in the foregoing method embodiments and/or another process used for the technology described in this application, and may further run an operating system, and is responsible for managing the bus and executing a program or an instruction stored in the memory.

The baseband circuit 1530, the radio frequency circuit 1540, and the antenna 1550 may be configured to support information transmitting and receiving between the first network element and the terminal in the foregoing embodiments, to support wireless communication between the first network element and the terminal.

The memory 1520 may be configured to store program code and data of a transmit end, and the memory 1520 may be a storage module 1530 in FIG. 15. It may be understood that the baseband circuit 1530, the radio frequency circuit 1540, and the antenna 1550 may be further configured to support communication between the first network element and another network entity, for example, configured to support communication between the first network element and another network element. In FIG. 15, the memory 1520 is shown to be separated from the processor 1510. However, a person skilled in the art can easily understand that the memory 1520 or any part thereof may be located outside the extended authentication apparatus 1500 for a generic bootstrapping architecture. For example, the memory 1520 may include a transmission line and/or a computer product separated from a wireless node, and these media may be accessed by the processor 1510 by using a bus interface 1560. Alternatively, the memory 1520 or any part thereof may be integrated into the processor 1510, for example, may be a cache and/or a general register.

It may be understood that FIG. 15 shows only a simplified design of the first network element. For example, in actual application, the first network element may include any quantity of transmitters, receivers, processors, memories, and the like, and all first network elements that can implement this application are within the protection scope of this application.

In a possible implementation, an extended authentication apparatus for a generic bootstrapping architecture on a first network element side may be alternatively implemented by using the following: one or more field programmable gate arrays (FPGA), a programmable logic device (PLD), a controller, a state machine, gate logic, a discrete hardware component, any other suitable circuit, or any combination of circuits that can execute various functions described in this application. In still another example, an embodiment of this application further provides a computer storage medium, and the computer storage medium may store a program instruction used to indicate any one of the foregoing methods, so that the processor executes the program instruction to implement the method and the function that are related to the first network element in the foregoing method embodiments.

Figure 16:
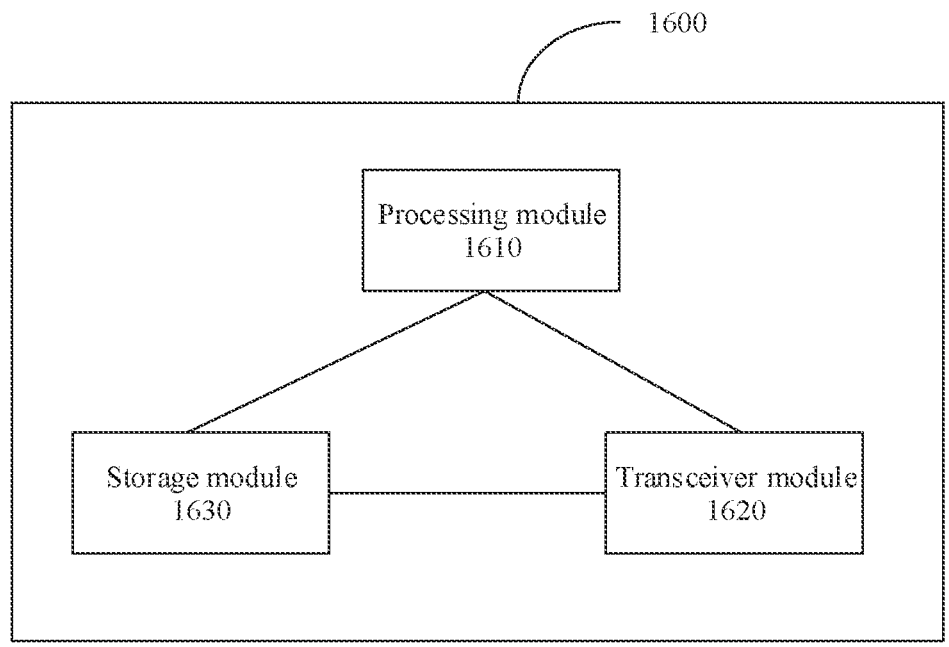
FIG. 16 is a schematic block diagram of an extended authentication apparatus for a generic bootstrapping architecture according to still another embodiment of this application.

A schematic structure of the extended authentication apparatus for a generic bootstrapping architecture is described in detail in the embodiments of this application. In an example, FIG. 16 is a schematic block diagram of an extended authentication apparatus for a generic bootstrapping architecture according to still another embodiment of this application. An extended authentication apparatus 1600 for a generic bootstrapping architecture in this embodiment of this application may be the terminal in the foregoing method embodiments, or may be one or more chips in the terminal. The extended authentication apparatus 1600 for a generic bootstrapping architecture may be configured to perform some or all functions of the terminal in the foregoing method embodiments. The extended authentication apparatus 1600 for a generic bootstrapping architecture may include a processing module 1610 and a transceiver module 1620. Optionally, the extended authentication apparatus 1600 for a generic bootstrapping architecture may further include a storage module 1630. The transceiver module 1620 is configured to receive a B-TID and a key lifetime.

Alternatively, the extended authentication apparatus 1600 for a generic bootstrapping architecture may be configured as a general processing system, such as a chip. The processing module 1610 may include one or more processors that provide a processing function. The transceiver module 1620 may be, for example, an input/output interface, a pin, or a circuit, and the input/output interface may be configured to be responsible for information exchange between this chip system and the outside. The one or more processors may execute a computer execution instruction stored in the storage module 1630, to implement a function of the terminal in the foregoing method embodiments. In an example, the storage module 1630 optionally included in the extended authentication apparatus 1600 for a generic bootstrapping architecture may be an in-chip storage unit, such as a register or a cache, and the storage module 1630 may be alternatively a storage unit that is in the terminal and that is outside the chip, such as a ROM or another type of static storage device that can store static information and an instruction, or a RAM.

Figure 17:
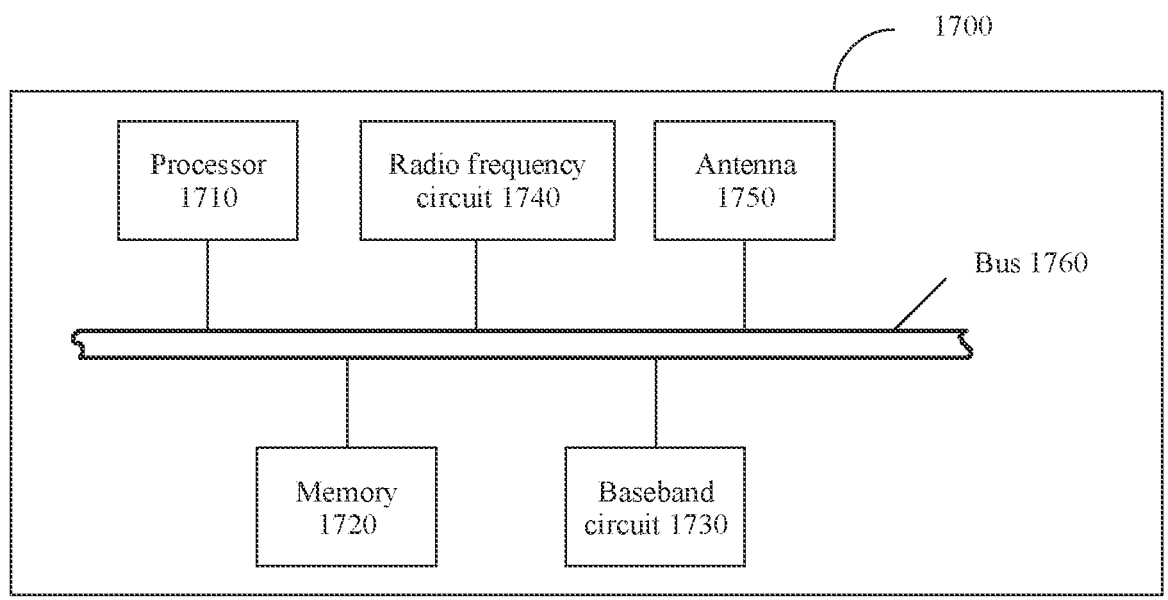
FIG. 17 is a schematic block diagram of an extended authentication apparatus for a generic bootstrapping architecture according to still another embodiment of this application.

In another example, FIG. 17 is a schematic block diagram of an extended authentication apparatus for a generic bootstrapping architecture according to still another embodiment of this application. An extended authentication apparatus 1700 for a generic bootstrapping architecture in this embodiment of this application may be the terminal in the foregoing method embodiments. The extended authentication apparatus 1700 for a generic bootstrapping architecture may be configured to perform some or all functions of the terminal in the foregoing method embodiments. The extended authentication apparatus 1700 for a generic bootstrapping architecture may include a processor 1710, a baseband circuit 1730, a radio frequency circuit 1740, and an antenna 1750. Optionally, the extended authentication apparatus 1700 for a generic bootstrapping architecture may further include a memory 1720. Components of the extended authentication apparatus 1700 for a generic bootstrapping architecture are coupled by using a bus 1760. In addition to a data bus, a bus system 1760 further includes a power bus, a control bus, and a status signal bus. However, for clear description, various types of buses in the figure are marked as the bus system 1760.

The processor 1710 may be configured to control the terminal and is configured to perform processing performed by the terminal in the foregoing embodiments. The processor 1710 may perform a processing process related to the terminal in the foregoing method embodiments and/or another process used for the technology described in this application, and may further run an operating system, and is responsible for managing the bus and executing a program or an instruction stored in the memory.

The baseband circuit 1730, the radio frequency circuit 1740, and the antenna 1750 may be configured to support information transmitting and receiving between the terminal and the first network element in the foregoing embodiments, to support wireless communication between the terminal and the first network element. One memory 1720 may be configured to store program code and data of a transmit end, and the memory 1720 may be a storage module 1730 in FIG. 17. It may be understood that the baseband circuit 1730, the radio frequency circuit 1740, and the antenna 1750 may be further configured to support the terminal in communicating with another network entity.

It may be understood that FIG. 17 shows only a simplified design of the terminal. For example, in actual application, the terminal may include any quantity of transmitters, receivers, processors, memories, and the like, and all terminals that can implement this application are within the protection scope of this application.

In a possible implementation, an extended authentication apparatus for a generic bootstrapping architecture on a terminal side may be alternatively implemented by using the following: one or more field programmable gate arrays (FPGA), a programmable logic device (PLD), a controller, a state machine, gate logic, a discrete hardware component, any other suitable circuit, or any combination of circuits that can execute various functions described in this application.

In still another example, an embodiment of this application further provides a computer storage medium, and the computer storage medium may store a program instruction used to indicate any one of the foregoing methods, so that the processor executes the program instruction to implement the method and the function that are related to the terminal in the foregoing method embodiments.

The processors involved in the extended authentication apparatus 1500 for a generic bootstrapping architecture and the extended authentication apparatus 1700 for a generic bootstrapping architecture may be general-purpose processors, such as a general-purpose central processing unit (CPU), a network processor (NP for short), or a microprocessor, or may be an application-specific integrated circuit (ASIC for short), or one or more integrated circuits configured to control program execution in the solution of this application. The processors may be alternatively digital signal processors (DSP for short), field programmable gate arrays (FPGA for short) or other programmable logic devices, discrete gates or transistor logic devices, or discrete hardware components. Alternatively, the controller/processor may be a combination implementing a computing function, for example, a combination of one or more microprocessors, or a combination of the DSP and the microprocessor. The processor generally performs logical and arithmetic operations based on a program instruction stored in the memory.

The memories involved in the extended authentication apparatus 1500 for a generic bootstrapping architecture and the extended authentication apparatus 1700 for a generic bootstrapping architecture may further store an operating system and another application program. Specifically, the program may include program code, and the program code includes a computer operation instruction. More specifically, the memory may be a read-only memory (ROM for short), another type of static storage device that can store static information and an instruction, a random access memory (RAM for short), another type of dynamic storage device that can store information and an instruction, a disk memory, or the like. The memory may be a combination of the foregoing memory types. In addition, the foregoing computer-readable storage medium/memory may be distributed in the processor, may be distributed outside the processor, or may be distributed on a plurality of entities including the processor or a processing circuit. The foregoing computer-readable storage medium/memory may be specifically embodied in a computer program product. For example, the computer program product may include a computer-readable medium in an encapsulation material.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

An embodiment of this application provides a computing storage medium, including a program instruction. The program instruction is used to implement the method in any one of the foregoing embodiments.

What is claimed is:

1. A method for deriving a key, comprising:
generating, by an apparatus, a second key using a key derivation function with input parameters comprising an indicator indicating a protocol type, an identity of a user equipment (UE), and a first key in an authentication process; and
generating, by the apparatus based on the second key, a third key shared between the UE and an application function.

2. The method according to claim 1, wherein the identity of the UE is a subscription permanent identifier (SUPI).

3. The method according to claim 1, wherein the indicator indicates at least one of the following protocol indicators: extensible authentication protocol (EAP), EAP authentication and key agreement (AKA), EAP AKA', 5G, 5G AKA, generic bootstrapping architecture (GBA), or 5G GBA.

4. The method according to claim 1, wherein the generating, based on the second key, a third key shared between the UE and an application function comprises:
generating, by the apparatus, the third key based on an identity of bootstrapping server function and the second key.

5. The method according to claim 1, wherein the generating, based on the second key, a third key shared between the UE and an application function comprises:
generating, by the apparatus, the third key based on a server name of bootstrapping server function and the second key.

6. The method according to claim 1, wherein the first key is Kausf that is shared with an authentication server function (AUSF).

7. An apparatus, comprising:
at least one processor; and
one or more memories coupled to the at least one processor and storing programming instructions for execution by the at least one processor, the programming instructions instructing the at least one processor to:
generate a second key using a key derivation function with input parameters comprising an indicator indicating a protocol type, an identity of the apparatus, and a first key in an authentication process; and
generate, based on the second key, a third key shared between the apparatus and an application function.

8. The apparatus according to claim 7, wherein the identity of the apparatus is a subscription permanent identifier (SUPI).

9. The apparatus according to claim 7, wherein indicator indicates at least one of the following protocol indicators: EAP, EAP AKA, EAP AKA', 5G, 5G AKA, GBA, or 5G GBA.

10. The apparatus according to claim 7, wherein the programming instructions instruct the at least one processor to generate the third key based on an identity of bootstrapping server function and the second key.

11. The apparatus according to claim 7, wherein the programming instructions instruct the at least one processor to generate the third key based on a server name of bootstrapping server function and the second key.

12. The apparatus according to claim 7, wherein the first key is Kausf that is shared with an authentication server function (AUSF).

13. A non-transitory computer-readable storage medium, comprising a program instruction, wherein the program instruction instructs at least one processor to:
generate a second key using a key derivation function with input parameters comprising an indicator indicating a protocol type, an identity of a user equipment (UE), and a first key in an authentication process; and
generate, based on the second key, a third key shared between the UE and an application function.

14. The non-transitory computer-readable storage medium according to claim 13, wherein the identity of the UE is a subscription permanent identifier (SUPI).

15. The non-transitory computer-readable storage medium according to claim 13, wherein indicator indicates at least one of the following protocol indicators: EAP, EAP AKA, EAP AKA', 5G, 5G AKA, GBA, or 5G GBA.

16. The non-transitory computer-readable storage medium according to claim 13, wherein the programming instructions instruct the at least one processor to generate the third key based on an identity of bootstrapping server function and the second key.

17. The non-transitory computer-readable storage medium according to claim 13, wherein the programming instructions instruct the at least one processor to generate the third key based on a server name of bootstrapping server function and the second key.

18. The non-transitory computer-readable storage medium according to claim 13, wherein the first key is Kausf that is shared with an authentication server function (AUSF).

* * * * *